US012777150B2

(12) United States Patent
Zhao

(10) Patent No.: US 12,777,150 B2
(45) Date of Patent: Oct. 27, 2026

(54) VIDEO ENCODING AND DECODING USING SAME-LOCATION BLOCKS ACROSS VIEWS

(71) Applicant: HiSilicon (Shanghai) Technologies CO., LIMITED, Shanghai (CN)

(72) Inventor: Riyang Zhao, Shenzhen (CN)

(73) Assignee: HiSilicon (Shanghai) Technologies CO., LIMITED, Shanghai (CN)

( * ) Notice: Subject to any disclaimer, the term of this patent is extended or adjusted under 35 U.S.C. 154(b) by 0 days.

(21) Appl. No.: 18/954,267

(22) Filed: Nov. 20, 2024

(65) Prior Publication Data

US 2025/0088630 A1 Mar. 13, 2025

Related U.S. Application Data

(63) Continuation of application No. PCT/CN2023/091342, filed on Apr. 27, 2023.

(30) Foreign Application Priority Data

May 20, 2022 (CN) ......................... 202210557264.1

(51) Int. Cl.
*H04N 19/119* (2014.01)
*H04N 19/176* (2014.01)

(52) U.S. Cl.
CPC ......... *H04N 19/119* (2014.11); *H04N 19/176* (2014.11)

(58) Field of Classification Search
CPC .................................................... H04N 19/119

(Continued)

(56) References Cited

U.S. PATENT DOCUMENTS

| | | | | |
|---|---|---|---|---|
| 9,351,004 | B2 | 5/2016 | Cherif et al. | |
| 9,363,500 | B2 * | 6/2016 | Takahashi ............ | H04N 13/161 |

(Continued)

FOREIGN PATENT DOCUMENTS

| | | | |
|---|---|---|---|
| CN | 105589506 | A | 5/2016 |
| CN | 111726598 | A | 9/2020 |

(Continued)

OTHER PUBLICATIONS

Cho et al., "MVC High-Level syntax for decoding base view in AVC (JVT-X025)," ETRI, Electronics and Telecommunications Research Institute, XP030007133, total 9 pages (Jun. 29-Jul. 6, 2007).

(Continued)

*Primary Examiner* — Leron Beck

(74) *Attorney, Agent, or Firm* — Leydig, Voit & Mayer, Ltd.

(57) ABSTRACT

A video encoding method, a video decoding method, and a related apparatus are provided, and pertains to the field of video compression technologies. The video encoding method includes: obtaining video pictures of a plurality of viewing angles at a same moment, and dividing each video picture into N picture blocks; and generating encoded data of the N picture blocks based on the video pictures of the plurality of viewing angles, wherein the encoded data of at least one picture block of the N picture blocks includes reference information of a non-independent encoding viewing angle, indicating that a picture block of the non-independent encoding viewing angle may be decoded with reference to encoded information of a picture block of another viewing angle. According to the application, the data amount to be encoded or decoded is small, thereby improving a data compression rate, and reducing bandwidths occupied by a video compression stream.

20 Claims, 8 Drawing Sheets

(58) Field of Classification Search
USPC ........................................ 375/240.01–240.29
See application file for complete search history.

(56) References Cited

U.S. PATENT DOCUMENTS

| | | | | |
|---|---|---|---|---|
| 11,330,295 | B2 * | 5/2022 | Aflaki Beni | H04N 23/698 |
| 2010/0111169 | A1 * | 5/2010 | Jeon | H04N 19/70 375/E7.243 |
| 2011/0013884 | A1 * | 1/2011 | Sasaki | G11B 27/005 386/E9.011 |
| 2011/0013888 | A1 * | 1/2011 | Sasaki | H04N 21/234327 386/354 |
| 2011/0216827 | A1 * | 9/2011 | Luo | H04N 19/436 375/E7.243 |
| 2013/0243092 | A1 * | 9/2013 | Sugio | H04N 19/46 375/240.16 |
| 2013/0279576 | A1 * | 10/2013 | Chen | H04N 19/70 375/240.12 |
| 2013/0301725 | A1 * | 11/2013 | Wang | H04N 19/176 375/240.16 |
| 2015/0172714 | A1 * | 6/2015 | Wu | H04N 19/96 375/240.12 |
| 2015/0201216 | A1 * | 7/2015 | Lin | H04N 19/105 348/42 |
| 2015/0229945 | A1 * | 8/2015 | Nakagami | H04N 19/55 375/240.16 |
| 2015/0271486 | A1 * | 9/2015 | Lin | H04N 19/103 375/240.24 |
| 2015/0281733 | A1 * | 10/2015 | Fu | H04N 19/105 375/240.16 |
| 2020/0137382 | A1 * | 4/2020 | Zhao | H04N 13/282 |
| 2022/0417543 | A1 * | 12/2022 | Choi | H04N 19/70 |

FOREIGN PATENT DOCUMENTS

| | | | |
|---|---|---|---|
| CN | 112823525 | A | 5/2021 |
| KR | 20210036795 | A | 4/2021 |
| WO | 2014166964 | A1 | 10/2014 |

OTHER PUBLICATIONS

Kimata et al., "Proposal on Profiles for MVC (Multi-view Video Coding)," International Organization for Standarization, Coding of Moving Pictures and Associated Audio, ISO/IEC JTC1/SC29/WG11 MPEG08/M15196, server date Aug. 27, 2010; downloaded by EPO on Aug. 6, 2019, XP030043793, Total 4 pages (Jan. 2008).

Ding et al., "Content-Aware Prediction Algorithm With Inter-View Mode Decision for Multiview Video Coding," IEEE Transactions on Multimedia, vol. 10, No. 8, XP011239053, total 12 pages (Dec. 2008).

* cited by examiner

VIDEO ENCODING AND DECODING USING SAME-LOCATION BLOCKS ACROSS VIEWS

CROSS-REFERENCE TO RELATED APPLICATIONS

This application is a continuation of International Application No. PCT/CN2023/091342, filed on Apr. 27, 2023, which claims priority to Chinese Patent Application No. 202210557264.1, filed on May 20, 2022. The disclosures of the aforementioned applications are hereby incorporated by reference in their entireties.

TECHNICAL FIELD

Embodiments of this application relates to the field of video compression technologies, and particularly, to a video encoding method, a video decoding method, and a related apparatus.

BACKGROUND

With development of video compression technologies and communication technologies, panoramic videos have emerged in various fields, bringing new viewing manners and visual experience to people. For example, in scenarios such as sports broadcast, concerts, and game live broadcast, audiences are no longer satisfied with a single viewing angle, and want to watch videos from a plurality of viewing angles to enjoy richer video experience.

Panoramic videos can be freely switched from 0 to 360 degrees. Usually, videos of a plurality of viewing angles need to be transmitted, and videos of each viewing angle are independently encoded and compressed. Videos of a plurality of viewing angles need to be encoded, compressed, transmitted, and decoded at the same time. This not only consumes a lot of computing resources of a device and increases device power consumption during encoding and decoding, but also occupies excessive channel bandwidths during transmission, and even causes a transmission failure due to excessively occupied bandwidths, which affects normal video playing.

SUMMARY

Embodiments of this application provide a video encoding method, a video decoding method, and a related apparatus, to reduce resource consumption in a video encoding and decoding process, and reduce bandwidths occupied by a video in a transmission process.

According to a first aspect, an embodiment of this application provides a video encoding method. The method may include the following steps: obtaining video pictures of a plurality of viewing angles at a same moment, and dividing each video picture into N picture blocks; generating encoded data of the N picture blocks based on the video pictures of the plurality of viewing angles; and obtaining a video compression stream of the plurality of viewing angles based on the encoded data of the N picture blocks. N is an integer greater than 1, and the encoded data of the N picture blocks includes encoded data of at least one target picture block. The encoded data of the target picture block includes encoded information of a target picture block of an independent encoding viewing angle and reference information of a non-independent encoding viewing angle, the reference information of the non-independent encoding viewing angle indicates to decode a target picture block of the non-independent encoding viewing angle with reference to the encoded information of the target picture block of the independent encoding viewing angle, and both the independent encoding viewing angle and the non-independent encoding viewing angle are included in the plurality of viewing angles.

In the encoded data of the N picture blocks generated in this embodiment of this application, encoded data of at least one picture block includes reference information of a non-independent encoding viewing angle, and the reference information is only indication information indicating that a picture block of the non-independent encoding viewing angle may be decoded with reference to encoded information of a picture block of another viewing angle. In comparison with encoded data obtained by encoding a picture block, a data amount of reference information is small. When a picture block of a non-independent encoding viewing angle may reference a picture block in a same location in another viewing angle, reference information may be used to reduce redundant information, improve a data compression rate, and reduce a data amount of obtained encoded data, to reduce bandwidths occupied by a video compression stream. This facilitates normal transmission of a video compression stream of a plurality of viewing angles, and enables video switching between different viewing angles to be smoother.

In addition, in comparison with independent encoding and compression of video pictures of a plurality of viewing angles, in this embodiment of this application, encoding and computing are not performed on the picture block of the non-independent encoding viewing angle that may reference the another viewing angle, so that computing resources consumed by a device in a video encoding and decoding process can be reduced, and power consumption of the device can be reduced.

In a possible implementation, each video picture may be divided into N picture blocks in a same division manner, and a number of a picture block at a same location in each video picture is the same. When the encoded data of the N picture blocks is generated, each numbered picture block is sequentially used as a to-be-encoded picture block according to a sequence of numbers of the N picture blocks, and encoded data of the to-be-encoded picture block is generated in the following manner: encoding a to-be-encoded picture block of a first viewing angle in the plurality of viewing angles to obtain encoded information of the first viewing angle; and for each non-first viewing angle other than the first viewing angle in the plurality of viewing angles, if the non-first viewing angle is a non-independent encoding viewing angle, generating reference information of the non-first viewing angle; or if the non-first viewing angle is an independent encoding viewing angle, generating encoded information of a to-be-encoded picture block of the non-first viewing angle. The first viewing angle is an independent encoding viewing angle In the foregoing embodiment, according to a sequence of numbers of the picture blocks, picture blocks that are of all viewing angles and that have a same number are processed, and then, picture blocks that are of all viewing angles and that have a next number are processed. When the picture blocks with a same number are processed, for a non-independent encoding viewing angle, reference information of the non-independent encoding viewing angle is generated, so that redundant information of picture blocks at a same location of viewing angles can be reduced.

In a possible implementation, for the non-first viewing angle, a to-be-encoded picture block of the non-first viewing angle may be separately compared with the to-be-encoded picture block of each determined independent encoding viewing angle, to determine the difference degree between each independent encoding viewing angle and the non-first viewing angle. If there is no independent encoding viewing angle with a difference degree meeting a specified difference degree threshold, it is determined that the non-first viewing angle is an independent encoding viewing angle, and the to-be-encoded picture block of the non-first viewing angle is encoded to obtain encoded information of the to-be-encoded picture block of the non-first viewing angle. If there is an independent encoding viewing angle with a difference degree meeting the specified difference degree threshold, it is determined that the non-first viewing angle is a non-independent encoding viewing angle, and reference information of the non-first viewing angle is generated based on information about a candidate independent encoding viewing angle, where the candidate independent encoding viewing angle indicates an independent encoding viewing angle whose difference degree meets the specified difference degree threshold.

For example, if the candidate independent encoding viewing angle includes only one independent encoding viewing angle, the candidate independent encoding viewing angle is used as a target independent encoding viewing angle, and the reference information of the non-first viewing angle is generated based on viewing angle identifier information of the target independent encoding viewing angle. If the candidate independent encoding viewing angle includes a plurality of independent encoding viewing angles, an independent encoding viewing angle with a smallest difference degree is used as a target independent encoding viewing angle, and the reference information of the non-first viewing angle is generated based on viewing angle identifier information of the target independent encoding viewing angle.

In the foregoing embodiment, the reference information of the non-independent encoding viewing angle includes only the viewing angle identifier information of the target independent encoding viewing angle, and a data amount of the reference information is small. This helps greatly reduce bandwidths occupied for communicating encoded data and storage space occupied for storing the encoded data.

In a possible implementation, when the reference information of the non-first viewing angle is generated, a pixel offset of the to-be-encoded picture block of the non-first viewing angle relative to a to-be-encoded picture block of the target independent encoding viewing angle may be determined, and reference information that includes the viewing angle identifier information of the target independent encoding viewing angle and the pixel offset may be generated, where the obtained reference information is the reference information of the non-first viewing angle.

In the foregoing embodiment, the reference information of the non-independent encoding viewing angle includes the pixel offset. During decoding, the picture block of the target independent encoding viewing angle may be adjusted based on the pixel offset, to obtain the picture block of the non-independent encoding viewing angle more accurately.

According to a second aspect, an embodiment of this application provides a video decoding method. The method includes the following steps:

- receiving a video compression stream of a plurality of viewing angles, and obtaining encoded data of N picture blocks included in the video compression stream, where N is an integer greater than 1, the encoded data of the N picture blocks is obtained by encoding video pictures of the plurality of viewing angles at a same moment, the encoded data of the N picture blocks includes encoded data of at least one target picture block, the encoded data of the target picture block includes encoded information of a target picture block of an independent encoding viewing angle and reference information of a non-independent encoding viewing angle, the reference information of the non-independent encoding viewing angle indicates to decode a target picture block of the non-independent encoding viewing angle with reference to the encoded information of the target picture block of the independent encoding viewing angle, and both the independent encoding viewing angle and the non-independent encoding viewing angle are included in the plurality of viewing angles;
- decoding the encoded data of the N picture blocks to obtain decoded data of the N picture blocks, where decoded data of each picture block includes decoded data of the plurality of viewing angles; and
- separately splicing decoded data of each viewing angle into one video picture to obtain video pictures of the plurality of viewing angles.

In comparison with independent encoding and compression of the video pictures of the plurality of viewing angles, in this embodiment of this application, the reference information of the non-independent encoding viewing angle included in the encoded data does not need to be independently decoded, and decoded data of the picture block of the non-independent encoding viewing angle may be obtained by referencing decoded data of a picture block of a target independent encoding viewing angle corresponding to the non-independent encoding viewing angle. Therefore, a computing amount in the decoding process can be reduced, computing resources consumed in the video decoding process can be reduced, and power consumption of a video playing device can be reduced.

In a possible implementation, when the encoded data of the N picture blocks is decoded, each numbered picture block may be sequentially used as a to-be-decoded picture block according to a sequence of numbers of the N picture blocks, and decoded data of the to-be-decoded picture block is obtained in the following manner: decoding encoded information of an independent encoding viewing angle included in encoded data of the to-be-decoded picture block, to obtain decoded data of the independent encoding viewing angle; if the encoded data of the to-be-decoded picture block includes reference information of a non-independent encoding viewing angle, determining, based on viewing angle identifier information included in the reference information of the non-independent encoding viewing angle, a target independent encoding viewing angle referenced by the non-independent encoding viewing angle; and obtaining decoded data of the non-independent encoding viewing angle based on decoded data of the target independent encoding viewing angle, where the decoded data of the target independent encoding viewing angle is obtained by decoding encoded information of a to-be-decoded picture block of the target independent encoding viewing angle.

In a possible implementation, the reference information of the non-independent encoding viewing angle includes a pixel offset, and the decoded data of the target independent encoding viewing angle is adjusted based on the pixel offset to obtain the decoded data of the non-independent encoding viewing angle.

According to a third aspect, an embodiment of this application further provides a video encoding apparatus, including a processor and a transceiver.

The processor is configured to: obtain video pictures of a plurality of viewing angles at a same moment, and divide each video picture into N picture blocks; generate encoded data of the N picture blocks based on the video pictures of the plurality of viewing angles; and obtain a video compression stream of the plurality of viewing angles based on the encoded data of the N picture blocks. N is an integer greater than 1. The encoded data of the N picture blocks includes encoded data of at least one target picture block. The encoded data of the target picture block includes encoded information of a target picture block of an independent encoding viewing angle and reference information of a non-independent encoding viewing angle. The reference information of the non-independent encoding viewing angle indicates to decode a target picture block of the non-independent encoding viewing angle with reference to the encoded information of the target picture block of the independent encoding viewing angle, and both the independent encoding viewing angle and the non-independent encoding viewing angle are included in the plurality of viewing angles.

The transceiver is configured to send, under control of the processor, the video compression stream of the plurality of viewing angles.

In a possible implementation, a picture block at a same location in each video picture has a same number; and the processor is specifically configured to: sequentially use each numbered picture block as a to-be-encoded picture block according to a sequence of numbers of the N picture blocks, and generate encoded data of the to-be-encoded picture block in the following manner: encoding a to-be-encoded picture block of a first viewing angle in the plurality of viewing angles to obtain encoded information of the first viewing angle, where the first viewing angle is an independent encoding viewing angle; and for each non-first viewing angle other than the first viewing angle in the plurality of viewing angles, if the non-first viewing angle is a non-independent encoding viewing angle, generating reference information of the non-first viewing angle; or if the non-first viewing angle is an independent encoding viewing angle, generating encoded information of a to-be-encoded picture block of the non-first viewing angle.

In a possible implementation, the processor may be specifically configured to: separately compare the to-be-encoded picture block of the non-first viewing angle with a to-be-encoded picture block of each determined independent encoding viewing angle, to determine a difference degree between each independent encoding viewing angle and the non-first viewing angle; if there is an independent encoding viewing angle with a difference degree meeting a specified difference degree threshold, determine that the non-first viewing angle is a non-independent encoding viewing angle; and generate the reference information of the non-first viewing angle based on information about a candidate independent encoding viewing angle, where the candidate independent encoding viewing angle indicates an independent encoding viewing angle whose difference degree meets the specified difference degree threshold.

In a possible implementation, the processor may be specifically configured to: if the candidate independent encoding viewing angle includes one independent encoding viewing angle, use the candidate independent encoding viewing angle as a target independent encoding viewing angle; and generate the reference information of the non-first viewing angle based on viewing angle identifier information of the target independent encoding viewing angle.

In a possible implementation, the processor may be specifically configured to: if the candidate independent encoding viewing angle includes a plurality of independent encoding viewing angles, use an independent encoding viewing angle with a smallest difference degree as a target independent encoding viewing angle; and generate the reference information of the non-first viewing angle based on viewing angle identifier information of the target independent encoding viewing angle.

In a possible implementation, the processor may be specifically configured to: determine a pixel offset of the to-be-encoded picture block of the non-first viewing angle relative to a to-be-encoded picture block of the target independent encoding viewing angle; and generate reference information that includes the viewing angle identifier information of the target independent encoding viewing angle and the pixel offset, where the reference information is the reference information of the non-first viewing angle.

In a possible implementation, the processor may be specifically configured to: separately compare the to-be-encoded picture block of the non-first viewing angle with the to-be-encoded picture block of each determined independent encoding viewing angle, to determine the difference degree between each independent encoding viewing angle and the non-first viewing angle; if there is no independent encoding viewing angle with a difference degree meeting the specified difference degree threshold, determine that the non-first viewing angle is an independent encoding viewing angle; and encode the to-be-encoded picture block of the non-first viewing angle, to obtain the encoded information of the to-be-encoded picture block of the non-first viewing angle.

According to a fourth aspect, an embodiment of this application further provides a video decoding apparatus, including a transceiver and a processor.

The transceiver is configured to receive, under control of the processor, a video compression stream of a plurality of viewing angles.

The processor is configured to: obtain encoded data of N picture blocks included in the video compression stream, where N is an integer greater than 1, the encoded data of the N picture blocks is obtained by encoding video pictures of the plurality of viewing angles at a same moment, the encoded data of the N picture blocks includes encoded data of at least one target picture block, the encoded data of the target picture block includes encoded information of a target picture block of an independent encoding viewing angle and reference information of a non-independent encoding viewing angle, the reference information of the non-independent encoding viewing angle indicates to decode a target picture block of the non-independent encoding viewing angle with reference to the encoded information of the target picture block of the independent encoding viewing angle, and both the independent encoding viewing angle and the non-independent encoding viewing angle are included in the plurality of viewing angles;

- decode the encoded data of the N picture blocks to obtain decoded data of the N picture blocks, where decoded data of each picture block includes decoded data of the plurality of viewing angles; and
- separately splice decoded data of each viewing angle into one video picture to obtain video pictures of the plurality of viewing angles.

In a possible implementation, the processor may be specifically configured to: sequentially use each numbered picture block as a to-be-decoded picture block according to a sequence of numbers of the N picture blocks, and obtain decoded data of the to-be-decoded picture block in the following manner: decoding encoded information of an independent encoding viewing angle included in encoded data of the to-be-decoded picture block, to obtain decoded data of the independent encoding viewing angle; if the encoded data of the to-be-decoded picture block includes reference information of a non-independent encoding viewing angle, determining, based on viewing angle identifier information included in the reference information of the non-independent encoding viewing angle, a target independent encoding viewing angle referenced by the non-independent encoding viewing angle; and obtaining decoded data of the non-independent encoding viewing angle based on decoded data of the target independent encoding viewing angle, where the decoded data of the target independent encoding viewing angle is obtained by decoding encoded information of a to-be-decoded picture block of the target independent encoding viewing angle.

In a possible implementation, the reference information of the non-independent encoding viewing angle includes a pixel offset. The processor may be specifically configured to adjust the decoded data of the target independent encoding viewing angle based on the pixel offset to obtain the decoded data of the non-independent encoding viewing angle.

According to a fifth aspect, an embodiment of this application further provides a video encoding apparatus. The video encoding apparatus includes corresponding functional modules. The functional modules are respectively configured to implement the steps in the methods provided in the first aspect. For details, refer to the detailed descriptions in the method examples. Details are not described herein again. The function may be implemented by hardware, or may be implemented by executing corresponding software by hardware. The hardware or software includes one or more modules corresponding to the foregoing functions. For example, the video encoding apparatus may include a picture division unit and a coding unit. The picture division unit is configured to obtain video pictures of a plurality of viewing angles at a same moment, and divide each video picture into N picture blocks, where N is an integer greater than 1. The coding unit is configured to generate encoded data of the N picture blocks based on the video pictures of the plurality of viewing angles, and obtain a video compression stream of the plurality of viewing angles based on the encoded data of the N picture blocks. The encoded data of the N picture blocks includes encoded data of at least one target picture block. The encoded data of the target picture block includes encoded information of a target picture block of an independent encoding viewing angle and reference information of a non-independent encoding viewing angle. The reference information of the non-independent encoding viewing angle indicates to decode a target picture block of the non-independent encoding viewing angle with reference to the encoded information of the target picture block of the independent encoding viewing angle, and both the independent encoding viewing angle and the non-independent encoding viewing angle are included in the plurality of viewing angles.

According to a sixth aspect, an embodiment of this application further provides a video decoding apparatus. The video decoding apparatus includes corresponding functional modules. The functional modules are respectively configured to implement the steps in the methods provided in the second aspect. For details, refer to the detailed descriptions in the method examples. Details are not described herein again. The function may be implemented by hardware, or may be implemented by executing corresponding software by hardware. The hardware or software includes one or more modules corresponding to the foregoing functions. For example, the video decoding apparatus may include a data receiving unit and a decoding unit. The data receiving unit is configured to receive a video compression stream of a plurality of viewing angles, and obtain encoded data of N picture blocks included in the video compression stream, where N is an integer greater than 1, the encoded data of the N picture blocks is obtained by encoding video pictures of the plurality of viewing angles at a same moment, the encoded data of the N picture blocks includes encoded data of at least one target picture block, the encoded data of the target picture block includes encoded information of a target picture block of an independent encoding viewing angle and reference information of a non-independent encoding viewing angle, the reference information of the non-independent encoding viewing angle indicates to decode a target picture block of the non-independent encoding viewing angle with reference to the encoded information of the target picture block of the independent encoding viewing angle, and both the independent encoding viewing angle and the non-independent encoding viewing angle are included in the plurality of viewing angles. The decoding unit is configured to: decode the encoded data of the N picture blocks to obtain decoded data of the N picture blocks, where decoded data of each picture block includes decoded data of the plurality of viewing angles; and separately splice decoded data of each viewing angle into one video picture to obtain video pictures of the plurality of viewing angles.

According to a seventh aspect, an embodiment of this application further provides a video transmission system, including any video encoding apparatus provided in the third aspect and any video decoding apparatus provided in the fourth aspect.

According to an eighth aspect, this application provides a computer-readable storage medium, where the computer-readable storage medium stores a computer program or instructions, and when the computer program or the instructions are executed by a terminal device, the terminal device is enabled to perform any method provided in the first aspect or any method provided in the second aspect.

According to a ninth aspect, this application provides a computer program product, where the computer program product includes a computer program or instructions, and when the computer program or the instructions are executed by a terminal device, any method provided in the first aspect or any method provided in the second aspect is implemented.

For technical effects that can be achieved in any one of the third aspect to the ninth aspect, refer to descriptions of beneficial effects in the first aspect or the second aspect. Details are not described herein again.

DESCRIPTION OF EMBODIMENTS

To enable the objectives, technical solutions, and advantages of embodiments of this application to be clearer, the following describes embodiments of this application in detail with reference to the accompanying drawings. Terms used in embodiments of this application are only used to explain specific embodiments of this application, but are not intended to limit this application. It is clear that the described embodiments are merely some rather than all of embodiments of this application. All other embodiments obtained by a person of ordinary skill in the art based on embodiments of this application without creative efforts shall fall within the protection scope of this application.

Before specific solutions provided in embodiments of this application are described, some terms in this application are generally explained and described, to facilitate understanding of a person skilled in the art. The terms in this application are not limited.

(1) Viewing angle: In an application scenario of a virtual reality (virtual reality, VR) video, an augmented reality (augment reality, AR) video, or a 360° panoramic video, video content watched by a user at a moment is referred to as a viewing angle.

In embodiments of this application, "a plurality of" means two or more. In view of this, in embodiments of this application, "a plurality of" may also be understood as "at least two". "At least one" may be understood as one or more, for example, one, two, or more. For example, "include at least one" means "include one, two, or more", and there is no limitation on which is included. For example, "include at least one of A, B, and C" may mean "include A, B, or C", "include A and B, A and C, or B and C", or "include A, B, and C". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Unless otherwise specified, ordinal numbers such as "first" and "second" in embodiments of this application are used to distinguish between a plurality of objects, and are not intended to limit a sequence, a time sequence, priorities, or importance of the plurality of objects.

Figure 1:
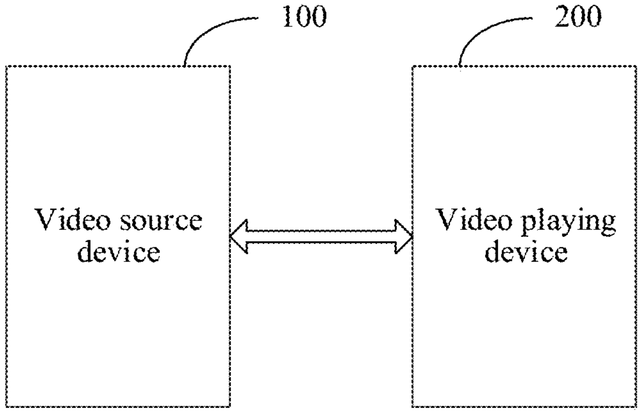
FIG. 1 is a schematic diagram of a structure of a video transmission system according to an embodiment of this application.

A video compression technology is widely used in fields such as the Internet, TV broadcasting, storage media, and communication. The video compression technology includes video encoding and video decoding. Video encoding usually refers to processing a sequence of pictures that form a video. Video encoding is performed on a source device side, and usually includes compressing an original video picture to reduce an amount of data needed to represent the video picture, for more efficient storage and transmission. Video decoding is performed on a destination device side, and usually includes inverse processing relative to an encoder to reconstruct a video picture. In the field of video compression technologies, the terms "picture (picture) ", "frame (frame)", or "image (image)" may be used as synonyms. FIG. 1 shows an example of an application scenario of a video compression technology. The application scenario may be considered as a video transmission system. As shown in FIG. 1, the video transmission system includes a video source device 100 and a video playing device 200. The video playing device may be understood as a destination device.

The video source device 100 is configured to obtain a video, encode the video, and provide encoded data to the video playing device 200. The video source device 100 may include or may be any type of picture capture device configured to capture a real-world picture, or any type of picture generation device. For example, the video source device 100 may include a computer graphics processing unit configured to generate a computer animation picture. Alternatively, the video source device 100 may include any type of device configured to obtain a real-world picture, or provide a computer-generated VR picture, or provide an AR picture combining a real-world picture and a virtual picture.

In some embodiments, the video source device 100 may directly send the encoded data to the video playing device 200 after encoding the video. For example, the video source device 100 may communicate with the video playing device 200 in a wired communication manner or a wireless communication manner. In some other embodiments, after encoding the video, the video source device 100 may store the encoded data in a storage device, and then, the video playing device 200 obtains the encoded data from the storage device.

The video playing device 200 is configured to decode the obtained encoded data, and output a video picture obtained through decoding to a display device for playing.

With development of video compression technologies and communication technologies, VR, AR, and 360° panoramic videos have emerged in various fields, bringing new viewing manners and visual experience to people. For example, in scenarios such as sports broadcast, concerts, and game live broadcast, audiences are no longer satisfied with a single viewing angle, and want to watch videos from a plurality of viewing angles to enjoy richer video experience.

Figure 2:
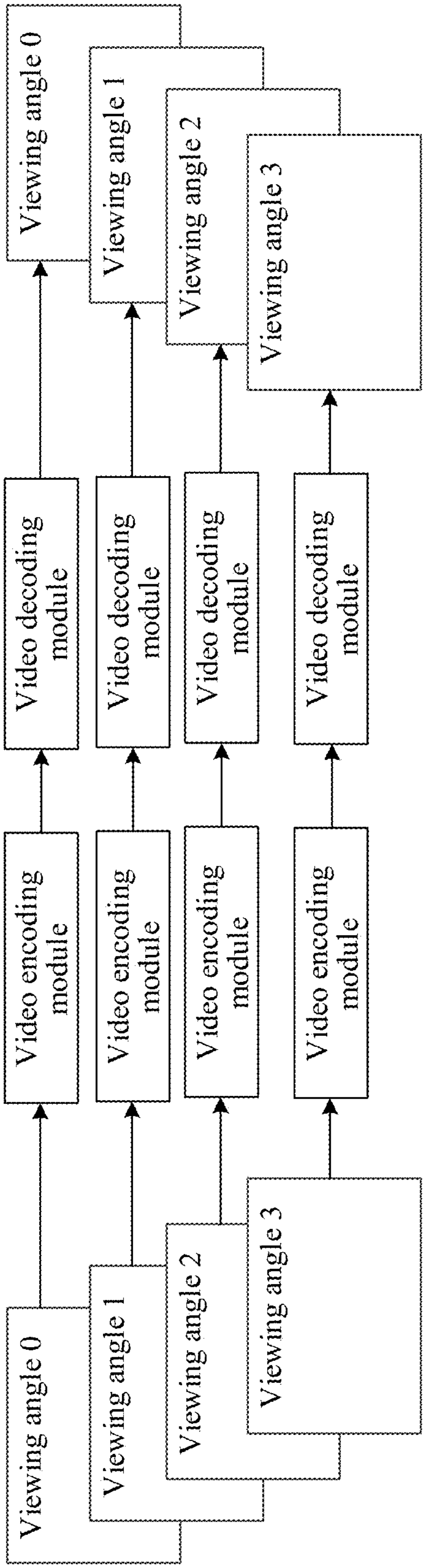
FIG. 2 is a schematic diagram of a video encoding and decoding process in a conventional technology.

The panoramic video may support free switching form 0 degree to 360 degrees, so that a user can freely switch a viewing angle in an all-round manner on the video playing device 200. Videos of a plurality of viewing angles usually need to be transmitted, and encoding and compression are independently performed on a video of each viewing angle, to achieve best viewing experience. For example, as shown in FIG. 2, it is assumed that video pictures of four viewing angles need to be transmitted, and the four viewing angles are respectively a viewing angle 0, a viewing angle 1, a viewing angle 2, and a viewing angle 3. In a video source device, the video pictures of the four viewing angles need to be encoded by using an independent video encoding module, and video encoded data after the encoding is transmitted to the video playing device. In a video playing device, the video encoded data of the four viewing angles needs to be decoded by using an independent video decoding module, to obtain the video pictures of the four viewing angles.

Videos of a plurality of viewing angles are encoded, compressed, transmitted, and decoded at the same time. During encoding and decoding, many computing resources of the video source device and the video playing device need to be consumed, and power consumption of devices is increased. In addition, during transmission, excessive channel bandwidths are occupied, and even transmission fails due to excessive bandwidths occupied. This affects normal video playing. For example, when a user needs to switch from one viewing angle to another viewing angle, a video picture of a viewing angle needed by the user has not been transmitted, and frame freezing occurs. This affects viewing experience of the user.

For example, the video playing device 200 is a television set. A current high-definition television set may play a 4K or 8K video. A bandwidth of more than 25 Mbps is needed for a video source device 11 to transmit a 4K video of one viewing angle to a video playing device 12. It is assumed that a panoramic video needs at least 4K videos of 10 viewing angles, and a bandwidth of more than 250 Mbps is needed for communicating the 4K videos of the 10 viewing angles. Most bandwidths cannot meet this bandwidth requirement.

Based on this, an embodiment of this application provides a video encoding/decoding method. The video encoding method may be performed by the video source device 100 in FIG. 1, and the video decoding method may be performed by the video playing device 200 in FIG. 1. The video encoding method includes: The video source device obtains video pictures of a plurality of viewing angles, and divides each video picture into N picture blocks, where N is an integer greater than 1. The video source device generates encoded data of the N picture blocks based on the video pictures of the plurality of viewing angles, and obtains a video compression stream of the plurality of viewing angles based on the encoded data of the N picture blocks. The encoded data of the N picture blocks includes encoded data of at least one target picture block, and the encoded data of the target picture block includes encoded information of a target picture block of an independent encoding viewing angle and reference information of a non-independent encoding viewing angle. The reference information of the non-independent encoding viewing angle indicates that a target picture block of the non-independent encoding viewing angle may be decoded with reference to the encoded information of the target picture block of the independent encoding viewing angle, where both the independent encoding viewing angle and the non-independent encoding viewing angle are viewing angles in the plurality of viewing angles.

In the encoded data of the N picture blocks generated by the video source device in this embodiment of this application, encoded data of at least one picture block includes reference information of a non-independent encoding viewing angle, and the reference information is only indication information indicating that a picture block of the non-independent encoding viewing angle may be decoded with reference to encoded information of a picture block of another viewing angle. In comparison with encoded data obtained by encoding a picture block, a data amount of reference information is small. When a picture block of a non-independent encoding viewing angle may reference a picture block in a same location in another viewing angle, reference information may be used to reduce redundant information, improve a data compression rate, and reduce a data amount of obtained encoded data, to reduce bandwidths occupied by a video compression stream. This facilitates normal transmission of a video compression stream of a plurality of viewing angles, enables video switching between different viewing angles to be smoother, and enables a user to watch a video more smoothly.

In addition, in comparison with independent encoding and compression of video pictures of a plurality of viewing angles, in this embodiment of this application, encoding and computing are not performed on the picture block of the non-independent encoding viewing angle that may reference the another viewing angle, so that computing resources consumed by a device in a video encoding and decoding process can be reduced, and power consumption of the device can be reduced.

Figure 3:
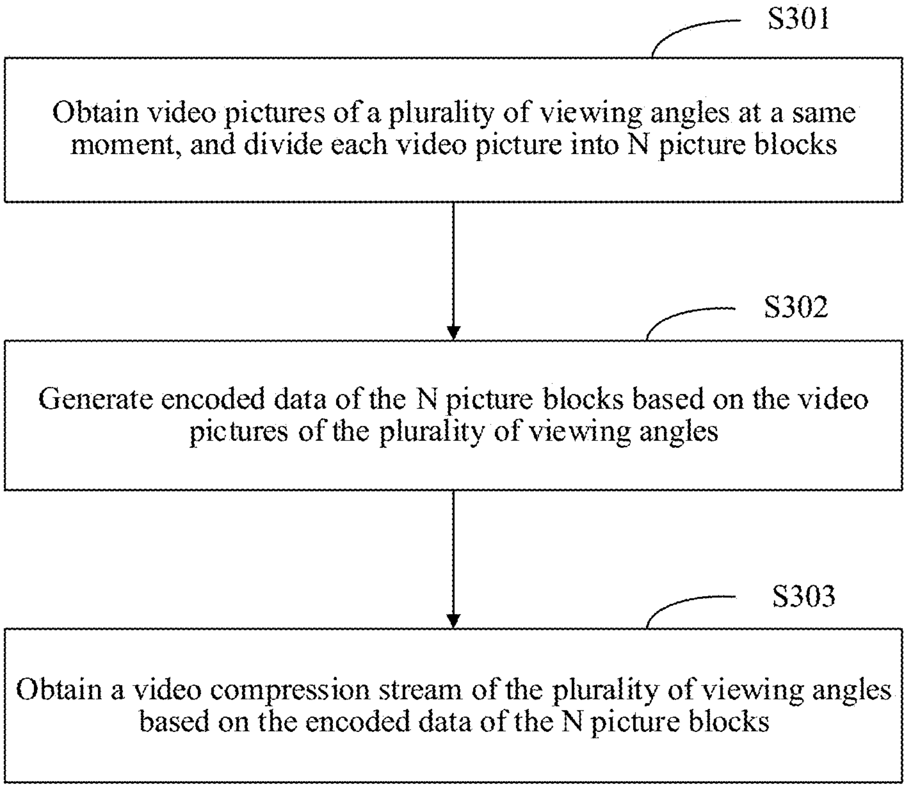
FIG. 3 is a flowchart of a video encoding method according to an embodiment of this application.

FIG. 3 shows an example of a flowchart of a video encoding method according to an embodiment of this application. The video encoding method may be performed by the video source device 100 in FIG. 1. As shown in FIG. 3, the method may include the following steps.

S301: Obtain video pictures of a plurality of viewing angles at a same moment, and divide each video picture into N picture blocks.

The video source device captures the video pictures in a real scenario from the plurality of viewing angles, or generates the video pictures of the plurality of viewing angles. For the video pictures of the plurality of viewing angles captured at the same moment or the generated video pictures of the plurality of viewing angles at the same moment, the video source device divides a video picture of each viewing angle into N picture blocks in a same division manner. N is an integer greater than 1. Picture blocks at a same location in the video pictures have a same number.

S302: Generate encoded data of the N picture blocks based on the video pictures of the plurality of viewing angles.

The video source device may sequentially use each numbered picture block as a to-be-encoded picture block according to a sequence of numbers of the N picture blocks, and generate encoded data of the to-be-encoded picture block in the following manner:

encoding a to-be-encoded picture block of a first viewing angle in the plurality of viewing angles to obtain encoded information of the first viewing angle, where the first viewing angle is an independent encoding viewing angle; and for each non-first viewing angle other than the first viewing angle in the plurality of viewing angles, the following operations may be performed: separately comparing a to-be-encoded picture block of the non-first viewing angle with the to-be-encoded picture block of each determined independent encoding viewing angle, to determine the difference degree between each independent encoding viewing angle and the non-first viewing angle; and if there is no independent encoding viewing angle with a difference degree meeting a specified difference degree threshold, determining that the non-first viewing angle is an independent encoding viewing angle, and encoding the to-be-encoded picture block of the non-first viewing angle to obtain encoded information of the to-be-encoded picture block of the non-first viewing angle; or if there is an independent encoding viewing angle with a difference degree meeting the specified difference degree threshold, determining that the non-first viewing angle is a non-independent encoding viewing angle, and generating reference information of the non-first viewing angle based on information about a candidate independent encoding viewing angle, where the candidate independent encoding viewing angle indicates an independent encoding viewing angle whose difference degree meets the specified difference degree threshold.

For example, if the candidate independent encoding viewing angle includes only one independent encoding viewing angle, the candidate independent encoding viewing angle is used as a target independent encoding viewing angle, and the reference information of the non-first viewing angle is generated based on viewing angle identifier information of the target independent encoding viewing angle. If the candidate independent encoding viewing angle includes a plurality of independent encoding viewing angles, an independent encoding viewing angle with a smallest difference degree is used as a target independent encoding viewing angle, and the reference information of the non-first viewing angle is generated based on viewing angle identifier information of the target independent encoding viewing angle. The reference information of the non-first viewing angle includes the viewing angle identifier information of the target independent encoding viewing angle, and indicates that the to-be-encoded picture block of the non-first viewing angle may be decoded with reference to encoded information of a to-be-encoded picture block of the target independent encoding viewing angle. The encoded data of the to-be-encoded picture block may be obtained through the foregoing process. For the to-be-encoded picture block, if the plurality of viewing angles are independent encoding viewing angles, the encoded data of the to-be-encoded picture block includes encoded information of a to-be-encoded picture block of each independent encoding viewing angle; or if the plurality of viewing angles include both independent encoding viewing angles and non-independent encoding viewing angles, the encoded data of the to-be-encoded picture block includes encoded information of a to-be-encoded picture block of each independent encoding viewing angle and reference information of each non-independent encoding viewing angle.

With reference to the foregoing process, encoded data of each numbered picture block may be obtained, and the encoded data of the N picture blocks is obtained in total. The obtained encoded data of the N picture blocks includes at least encoded data of one target picture block. The target picture block indicates a picture block that includes encoded information of a picture block of an independent encoding viewing angle and reference information of a non-independent encoding viewing angle in the encoded data. The reference information of the non-independent encoding viewing angle indicates that a target picture block of the non-independent encoding viewing angle may be decoded with reference to the encoded information of the target picture block of the independent encoding viewing angle.

S303: Obtain a video compression stream of the plurality of viewing angles based on the encoded data of the N picture blocks.

The video compression stream of the plurality of viewing angles is generated based on the obtained encoded data of the N picture blocks, and the video compression stream of the plurality of viewing angles is transmitted to a video playing device, to provide a panoramic video for the video playing device.

In the foregoing embodiment, the video compression stream of the plurality of viewing angles includes reference information, and a data amount of the reference information is small. When a picture block of a non-independent encoding viewing angle may reference the picture block at a same location in another viewing angle, the reference information may be used to reduce redundant information, improve a data compression rate, and reduce a data amount of the video compression stream, to reduce bandwidths occupied by the video compression stream.

Figure 4A:
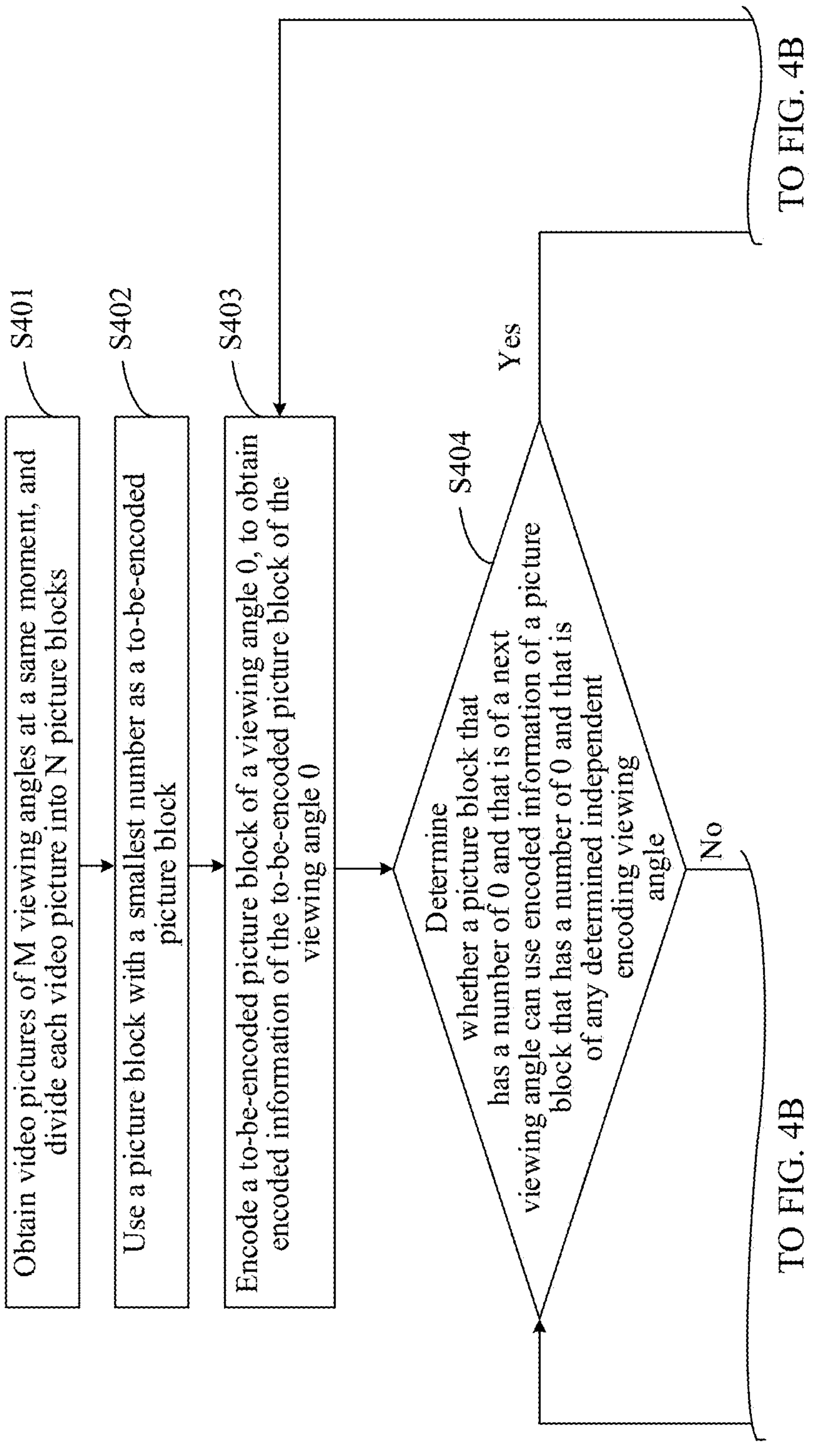
FIG. 4A and FIG. 4B are a flowchart of another video encoding method according to an embodiment of this application.
Figure 4B:
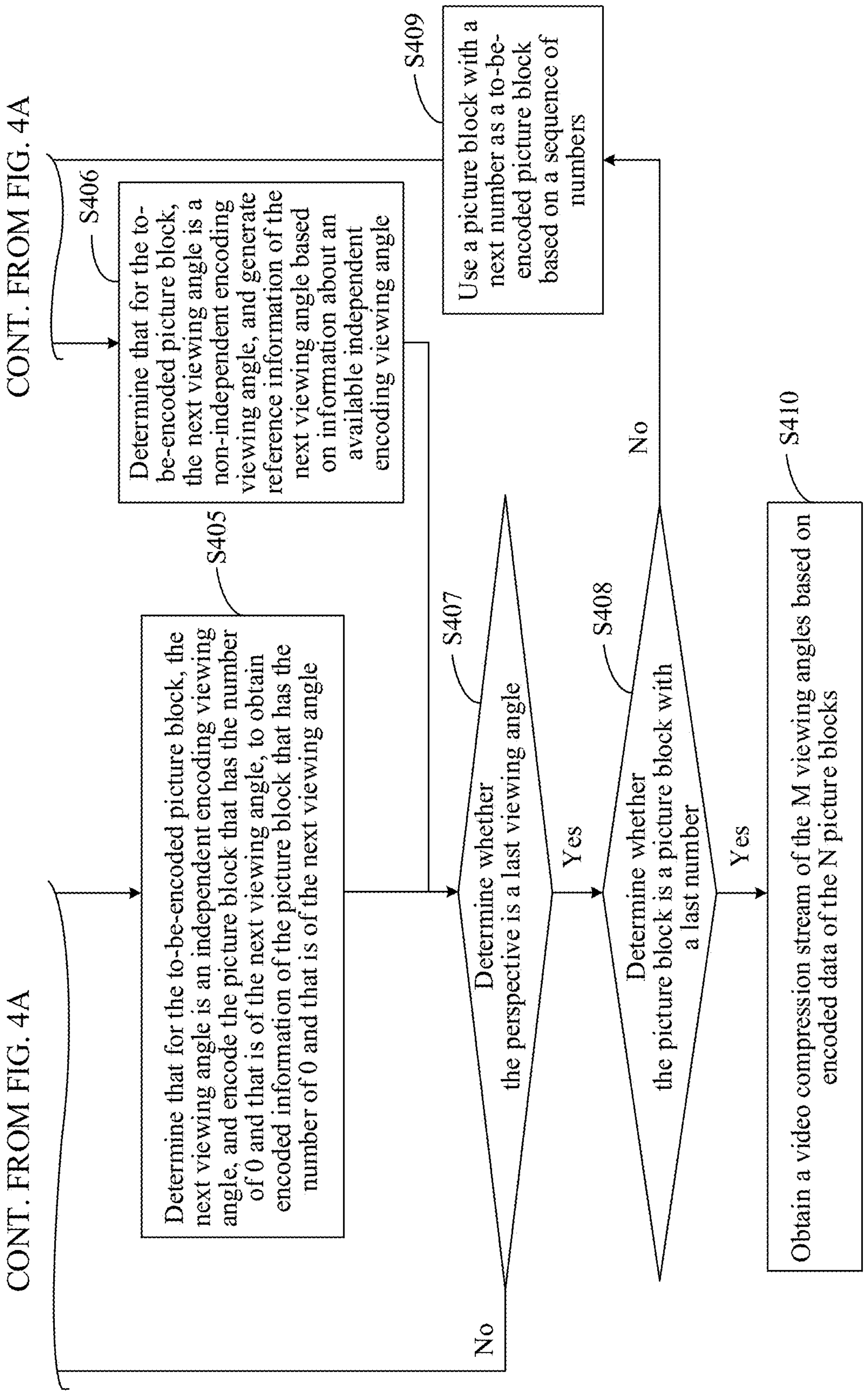

For ease of understanding, the following describes in detail the video encoding method provided in embodiments of this application by using a specific instance. As shown in FIG. 4A and FIG. 4B, the video encoding method may include the following steps.

S401: Obtain video pictures of M viewing angles at a same moment, and divide each video picture into N picture blocks.

Figure 5:
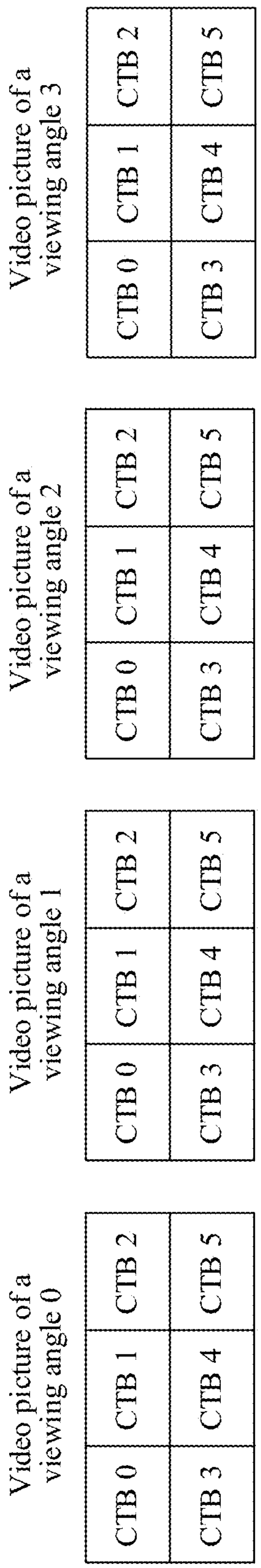
FIG. 5 is a schematic diagram of video pictures of a plurality of viewing angles according to an embodiment of this application.

In this embodiment of this application, encoding is performed based on the picture blocks. It is assumed that a video source device provides the video pictures of the M viewing angles to a video playing device. After obtaining the video pictures of the M viewing angles at the same moment, the video source device divides a video picture of each viewing angle into the N picture blocks in a same division manner. The picture block may also be referred to as a coding tree block (CTB), a coding tree unit (CTU), or a coding unit (CU). For example, it is assumed that M is 4, and the four viewing angles are respectively a viewing angle 0, a viewing angle 1, a viewing angle 2, and a viewing angle 3; and N is 6, and the video pictures of the four viewing angles each are divided into six picture blocks. As shown in FIG. 5, a video picture of the viewing angle 0 is divided into six picture blocks: CTB 0, CTB 1, CTB 2, CTB 3, CTB 4, and CTB 5, and video pictures of the viewing angle 1, the viewing angle 2, and the viewing angle 3 are also divided in the same manner. Picture blocks at a same location in the video pictures have a same number.

S402: Use a picture block with a smallest number as a to-be-encoded picture block.

The video source device may sequentially generate encoded data of each numbered picture block in ascending or descending order of numbers of the N picture blocks. In this embodiment, the ascending order of numbers is used as an example for description. First, the picture block with the smallest number, namely, a picture block whose number is 0, is used as the to-be-encoded picture block, and then each numbered picture block is sequentially used as a to-be-encoded picture block in ascending order of numbers, the to-be-encoded picture block is processed based on steps S403 to S407.

S403: Encode the to-be-encoded picture block of the viewing angle 0, to obtain encoded information of the to-be-encoded picture block of the viewing angle 0.

For example, the to-be-encoded picture block is the picture block whose number is 0 (CTB 0), and CTB 0 of the viewing angle 0 is encoded. For example, CTB 0 of the viewing angle 0 may be encoded according to a video compression protocol such as H.264 or high efficiency video coding (HEVC) launched by the international standard organization. CTB 0 is divided into a plurality of pixel blocks, information such as a residual and a motion vector difference (MVD) between each pixel block and a specified reference frame or reference pixel block is determined, and encoded data including identification information that is of the viewing angle 0 and that is of CTB 0 and information such as a residual and an MVD of each pixel block of CTB 0 is generated. The encoded data is encoded information that is of the viewing angle 0 and that is of CTB 0. The viewing angle 0 is a first viewing angle, namely, an initial viewing angle, and encoded information of a picture block of another viewing angle cannot be referenced. Therefore, the viewing angle 0 is an independent encoding viewing angle.

S404: Determine whether a picture block that has a number of 0 and that is of a next viewing angle can use encoded information of a picture block that has a number of 0 and that is of any determined independent encoding viewing angle; and if the picture block that has the number of 0 and that is of the next viewing angle can use the encoded information of the picture block that has the number of 0 and that is of any determined independent encoding viewing angle, perform step S406; or if the picture block that has the number of 0 and that is of the next viewing angle cannot use the encoded information of the picture block that has the number of 0 and that is of any determined independent encoding viewing angle, perform step S405.

S405: Determine that for the to-be-encoded picture block, the next viewing angle is an independent encoding viewing angle, and encode the picture block that has the number of 0 and that is of the next viewing angle, to obtain encoded information of the picture block that has the number of 0 and that is of the next viewing angle.

S406: Determine that for the to-be-encoded picture block, the next viewing angle is a non-independent encoding viewing angle, and generate reference information of the next viewing angle based on information about an available independent encoding viewing angle.

For example, a next viewing angle of the viewing angle 0 is a viewing angle 1. CTB 0 of the viewing angle 1 is compared with CTB 0 of the viewing angle 0, and a difference degree between CTB 0 of the viewing angle 1 and CTB 0 of the viewing angle 0 is determined by comparing pixel value differences between corresponding pixels in CTB 0 of the viewing angle 1 and corresponding pixels in CTB 0 of the viewing angle 0. If the difference degree between CTB 0 of the viewing angle 1 and CTB 0 of the viewing angle 0 is greater than a specified difference degree threshold, indicating that the difference degree between CTB 0 of the viewing angle 1 and CTB 0 of the viewing angle 0 is large, and CTB 0 of the viewing angle 1 cannot use encoded information of CTB 0 of the viewing angle 0, it is determined that for CTB 0, the viewing angle 1 is an independent encoding viewing angle, CTB 0 of the viewing angle 1 is encoded, to obtain encoded information of CTB 0 of the viewing angle 1. For example, the difference degree threshold may be set to 20%. For a specific process of encoding CTB 0 of the viewing angle 1, refer to the process of encoding CTB 0 of the viewing angle 0. Details are not described herein again. If the difference degree between CTB 0 of the viewing angle 1 and CTB 0 of the viewing angle 0 is less than or equal to the specified difference degree threshold, indicating that the difference degree between CTB 0 of the viewing angle 1 and CTB 0 of the viewing angle 0 is small, and CTB 0 of the viewing angle 1 may use the encoded information of CTB 0 of the viewing angle 0, it is determined that for CTB 0, the viewing angle 1 is a non-independent encoding viewing angle, and reference information of the viewing angle 1 may be generated based on information about the viewing angle 0.

In an embodiment, if it is determined that CTB 0 of the viewing angle 1 may use the encoded information of CTB 0 of the viewing angle 0, the reference information of the viewing angle 1 may be generated based on viewing angle identifier information of the viewing angle 0, that is, reference information including the viewing angle identifier information of the viewing angle 0 is generated as the reference information of the viewing angle 1. The reference information is used to indicate that CTB 0 of the viewing angle 1 may be decoded with reference to the encoded information of CTB 0 of the viewing angle 0.

In another embodiment, the reference information of the viewing angle 1 may further include a pixel offset of CTB 0 of the viewing angle 1 relative to CTB 0 of the viewing angle 0 in addition to the viewing angle identifier information of the viewing angle 0. In other words, if it is determined that CTB 0 of the viewing angle 1 may use the encoded information of CTB 0 of the viewing angle 0, the pixel offset of CTB 0 of the viewing angle 1 relative to CTB 0 of the viewing angle 0 may be determined based on CTB 0 of the viewing angle 1 and CTB 0 of the viewing angle 0. For example, the pixel offset of CTB 0 of the viewing angle 1 relative to CTB 0 of the viewing angle 0 may be determined by comparing a location of an object in CTB 0 of the viewing angle 1 with a location of the same object in CTB 0 of the viewing angle 0. The pixel offset may include one or more of a horizontal offset of a pixel, a vertical offset of the pixel, or a rotation angle offset of the pixel. After the pixel offset of CTB 0 of the viewing angle 1 relative to CTB 0 of the viewing angle 0 is determined, reference information including the viewing angle identifier information of the viewing angle 0 and the pixel offset may be generated as the reference information of the viewing angle 1. In a picture decoding process, CTB 0 of the viewing angle 0 obtained through decoding may be adjusted based on the pixel offset in the reference information, to obtain CTB 0 of the viewing angle 1.

In some embodiments, the generated reference information or encoded information of the viewing angle 1 includes a 1-bit flag, and the flag is used to identify whether corresponding information is the reference information or the encoded information. For example, if the flag is “0”, it indicates that the corresponding information is the reference information of the viewing angle 1. That is, when it is determined that the viewing angle 1 is a non-independent encoding viewing angle, the flag is set to “0”. If the flag is “1”, it indicates that the corresponding information is the encoded information of the viewing angle 1. That is, when it is determined that the viewing angle 1 is an independent encoding viewing angle, the flag is set to “1”.

S407: Determine whether the viewing angle is a last viewing angle; and if the viewing angle is not a last viewing angle, return to step S404; or if the viewing angle is the last viewing angle, perform step S408.

For example, if the viewing angle 1 is not the last viewing angle, and a next viewing angle of the viewing angle 1 is a viewing angle 2, return to step S404, to determine whether CTB 0 of the viewing angle 2 can use the encoded information of CTB 0 of any determined independent encoding viewing angle.

In some embodiments, if for CTB 0, both the viewing angle 0 and the viewing angle 1 are independent encoding viewing angles, CTB 0 of the viewing angle 2 is separately compared with CTB 0 of the viewing angle 0 and CTB 0 of the viewing angle 1, to determine a difference degree between CTB 0 of the viewing angle 0 and CTB 0 of the viewing angle 2 and a difference degree between CTB 0 of the viewing angle 1 and CTB 0 of the viewing angle 2. The difference degree between CTB 0 of the viewing angle 0 and CTB 0 of the viewing angle 2 is referred to as a difference degree corresponding to the viewing angle 0, and the difference degree between CTB 0 of the viewing angle 1 and CTB 0 of the viewing angle 2 is referred to as a difference degree corresponding to the viewing angle 1.

If both the difference degree corresponding to the viewing angle 0 and the difference degree corresponding to the viewing angle 1 are greater than the specified difference degree threshold, indicating that difference degrees between CTB 0 of the viewing angle 2 and CTB 0 of the viewing angle 0 and CTB 0 of the viewing angle 1 are large, and CTB 0 of the viewing angle 2 cannot use the encoded information of CTB 0 of the viewing angle 0 or the encoded information of CTB 0 of the viewing angle 1, it is determined that for CTB 0, the viewing angle 2 is an independent encoding viewing angle, CTB 0 of the viewing angle 2 is encoded to obtain encoded information of CTB 0 of the viewing angle 2. For a specific process of encoding CTB 0 of the viewing angle 2, refer to the process of encoding CTB 0 of the viewing angle 0. Details are not described herein again.

If the difference degree corresponding to the viewing angle 0 is less than or equal to the specified difference degree threshold, and the difference degree corresponding to the viewing angle 1 is greater than the specified difference degree threshold, indicating that the difference degree between CTB 0 of the viewing angle 2 and CTB 0 of the viewing angle 0 is small, and CTB 0 of the viewing angle 2 may use the encoded information of CTB 0 of the viewing angle 0, it is determined that for CTB 0, the viewing angle 2 is a non-independent encoding viewing angle, and reference information of the viewing angle 2 may be generated based on the information about the viewing angle 0.

If the difference degree corresponding to the viewing angle 0 is greater than the specified difference degree threshold, and the difference degree corresponding to the viewing angle 1 is less than or equal to the specified difference degree threshold, indicating that the difference degree between CTB 0 of the viewing angle 2 and CTB 0 of the viewing angle 1 is small, and CTB 0 of the viewing angle 2 may use the encoded information of CTB 0 of the viewing angle 1, it is determined that for CTB 0, the viewing angle 2 is a non-independent encoding viewing angle, and the reference information of the viewing angle 2 may be generated based on information about the viewing angle 1.

If both the difference degree corresponding to the viewing angle 0 and the difference degree corresponding to the viewing angle 1 are less than or equal to the specified difference degree threshold, it indicates that the difference degrees between CTB 0 of the viewing angle 2 and CTB 0 of the viewing angle 0 and CTB 0 of the viewing angle 1 are small, CTB 0 of the viewing angle 2 may use the encoded information of CTB 0 of the viewing angle 0, or may use the encoded information of CTB 0 of the viewing angle 1. Both the viewing angle 0 and the viewing angle 1 may be used as candidate independent encoding viewing angles. In this case, the difference degree corresponding to the viewing angle 0 and the difference degree corresponding to the viewing angle 1 may be compared, a viewing angle with a smaller difference degree is used as a target independent encoding viewing angle, and the reference information of the non-first viewing angle is generated based on information about the target independent encoding viewing angle. For example, if the difference degree corresponding to the viewing angle 0 is less than the difference degree corresponding to the viewing angle 1, the reference information of the viewing angle 2 is generated based on the information about the viewing angle 0. If the difference degree corresponding to the viewing angle 0 is greater than the difference degree corresponding to the viewing angle 1, the reference information of the viewing angle 2 is generated based on the information about the viewing angle 1.

In some other embodiments, if for CTB 0, the viewing angle 0 is an independent encoding viewing angle, and the viewing angle 1 is a non-independent encoding viewing angle, CTB 0 of the viewing angle 2 is compared with CTB 0 of the viewing angle 0, to determine the difference degree between CTB 0 of the viewing angle 0 and CTB 0 of the viewing angle 2, to determine whether the viewing angle 2 is an independent encoding viewing angle for CTB 0. If for CTB 0, the viewing angle 2 is an independent encoding viewing angle, CTB 0 of the viewing angle 2 is encoded to obtain the encoded information of CTB 0 of the viewing angle 2. If for CTB 0, the viewing angle 2 is a non-independent encoding viewing angle, the reference information of the viewing angle 2 is generated based on the information about the viewing angle 0.

After CTB 0 of the viewing angle 2 is processed, because the viewing angle 2 is not the last viewing angle, and a next viewing angle of the viewing angle 2 is a viewing angle 3, step S404 is still returned to process CTB 0 of the viewing angle 3 with reference to the foregoing process. Because the viewing angle 3 is the last viewing angle, after CTB 0 of the viewing angle 3 is processed, step S408 is further performed.

S408: Determine whether the picture block is a picture block with a last number; and if the picture block is not the picture block with the last number, perform step S409; or if the picture block is the picture block with the last number, perform step S410.

S409: Use a picture block with a next number as a to-be-encoded picture block based on a sequence of numbers, and return to perform step S403.

After processing of CTB 0 of all viewing angles is completed and encoded data of CTB 0 is generated, processing of CTB 1 to CTB 5 may be completed in sequence with reference to the foregoing process, to obtain encoded data of CTB 1 to CTB 5.

S410: Obtain a video compression stream of the M viewing angles based on encoded data of the N picture blocks.

Figure 6:
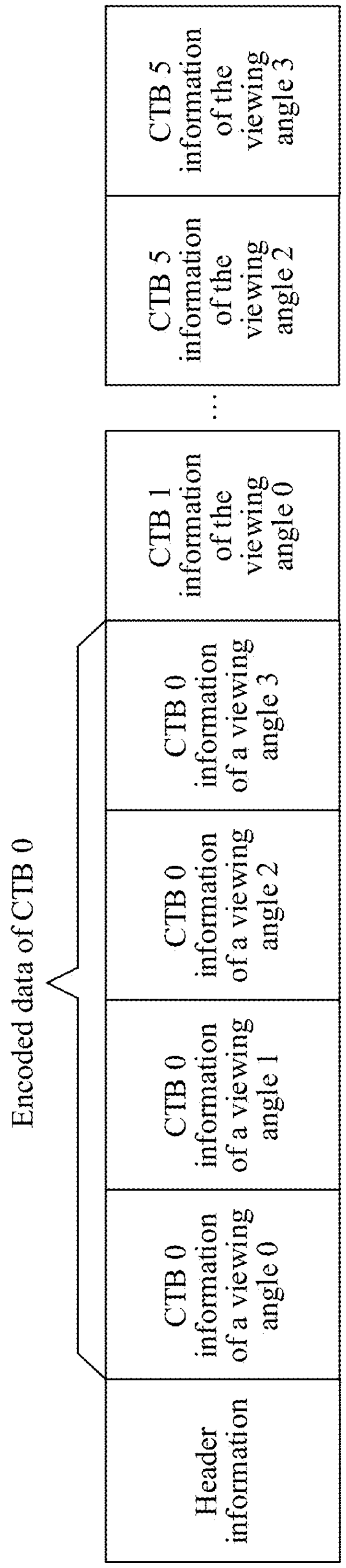
FIG. 6 is a schematic diagram of a video compression stream according to an embodiment of this application.

The video source device obtains the video compression stream of the four viewing angles based on encoded data of the six picture blocks, and transmits the video compression stream of the four viewing angles to the video playing device. FIG. 6 shows a structure of the video compression stream that is of the four viewing angles and that is obtained based on the encoded data of the six picture blocks, namely, CTB 0 to CTB 5. Header information may include a picture header (pic header) and a strip header, where the strip header is a header of a video strip, and may also be referred to as a slice header or a slice header. After the header information, CTB 0 information of the viewing angle 0 represents the encoded information of CTB 0 of the viewing angle 0. If for CTB 0, the viewing angle 1 is an independent encoding viewing angle, CTB 0 information of the viewing angle 1 represents the encoded information of CTB 0 of the viewing angle 1. If for CTB 0, the viewing angle 1 is a non-independent encoding viewing angle, the CTB 0 information of the viewing angle 1 represents the reference information of the viewing angle 1. For a meaning represented by CTB information of another viewing angle, refer to a meaning represented by the CTB 0 information of the viewing angle 1. Details are not described herein again.

After the video pictures of the four viewing angles at this moment or this frame are processed, video pictures of the four viewing angles at a next moment or a next frame may continue to be processed, to send a continuous video compression stream.

In the foregoing embodiment, dividing the video picture into the six picture blocks is merely an example for description. In another embodiment, the video picture may be divided into more or fewer picture blocks. The four viewing angles are also examples for description. In actual use, videos of more viewing angles may need to be transmitted, or videos of fewer viewing angles may need to be transmitted.

In comparison with independent encoding and compression of video pictures of a plurality of viewing angles, in this embodiment of this application, the video source device does not perform encoding and computing on a picture block of a non-independent encoding viewing angle that may reference another viewing angle, so that computing resources consumed in the video encoding process can be reduced, and power consumption of the video source device can be reduced.

Figure 7:
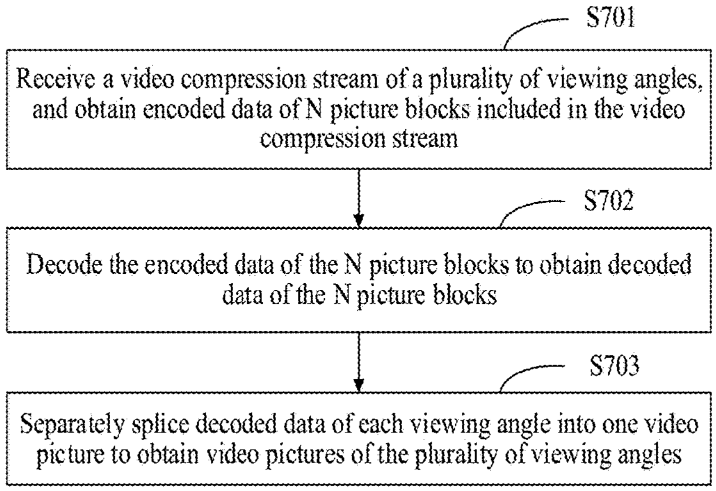
FIG. 7 is a flowchart of a video decoding method according to an embodiment of this application.

Based on a same inventive concept as the video encoding method in the foregoing embodiment, an embodiment of this application further provides a video decoding method. FIG. 7 shows an example of a flowchart of a video decoding method according to an embodiment of this application. The video decoding method may be performed by the video source device 100 in FIG. 1. As shown in FIG. 7, the method may include the following steps.

S701: Receive a video compression stream of a plurality of viewing angles, and obtain encoded data of N picture blocks included in the video compression stream.

The video compression stream includes the encoded data of the N picture blocks, where N is an integer greater than 1. The encoded data of the N picture blocks is obtained by encoding video pictures of the plurality of viewing angles at a same moment. The encoded data of the N picture blocks includes encoded data of at least one target picture block, and the encoded data of the target picture block includes encoded information of a target picture block of an independent encoding viewing angle and reference information of a non-independent encoding viewing angle. Both the independent encoding viewing angle and the non-independent encoding viewing angle are included in the plurality of viewing angles. The reference information of the non-independent encoding viewing angle indicates to decode a target picture block of the non-independent encoding viewing angle with reference to the encoded information of the target picture block of the independent encoding viewing angle.

S702: Decode the encoded data of the N picture blocks to obtain decoded data of the N picture blocks.

For example, when the encoded data of the N picture blocks is decoded, each numbered picture block is sequentially used as a to-be-decoded picture block in a sequence of numbers of the N picture blocks, and decoded data of the to-be-decoded picture block is obtained in the following manner:

decoding encoded information of an independent encoding viewing angle included in encoded data of the to-be-decoded picture block, to obtain decoded data of the independent encoding viewing angle; if the encoded data of the to-be-decoded picture block includes reference information of a non-independent encoding viewing angle, determining, based on viewing angle identifier information included in the reference information of the non-independent encoding viewing angle, a target independent encoding viewing angle referenced by the non-independent encoding viewing angle; and obtaining decoded data of the non-independent encoding viewing angle based on decoded data of the target independent encoding viewing angle. The decoded data of the target independent encoding viewing angle is obtained by decoding encoded information of a to-be-decoded picture block of the target independent encoding viewing angle.

In some embodiments, a part of to-be-decoded picture blocks may include only encoded information of independent encoding viewing angles, that is, the plurality of viewing angles are all independent encoding viewing angles. In this case, the encoded information of the plurality of viewing angles included in the encoded data of the to-be-decoded picture blocks is decoded to obtain decoded data of the plurality of viewing angles. Another part of the to-be-decoded picture blocks may include encoded information of an independent encoding viewing angle and reference information of a non-independent encoding viewing angle.

If the encoded data of the to-be-decoded picture block includes the reference information of the non-independent encoding viewing angle, the reference information of the non-independent encoding viewing angle may be obtained in the following manner:

in an embodiment, if the reference information of the non-independent encoding viewing angle includes only the viewing angle identifier information, the target independent encoding viewing angle referenced by the non-independent encoding viewing angle may be determined based on the viewing angle identifier information, and the decoded data of the target independent encoding viewing angle is obtained, where the decoded data of the target independent encoding viewing angle is used as the decoded data of the non-independent encoding viewing angle.

For example, assuming that CTB 0 is a to-be-decoded picture block, encoded data of CTB 0 includes reference information of a viewing angle 2, and viewing angle identifier information included in the reference information of the viewing angle 2 is an identifier of a viewing angle 1, it may be determined that a target independent encoding viewing angle referenced by the viewing angle 2 is the viewing angle 1, and decoded data of CTB 0 of the viewing angle 1 obtained by decoding encoded information of CTB 0 of the viewing angle 1 is obtained, where the decoded data of CTB 0 of the viewing angle 1 is used as decoded data of CTB 0 of the viewing angle 2.

In another embodiment, if the reference information of the non-independent encoding viewing angle includes the viewing angle identifier information and a pixel offset, the target independent encoding viewing angle referenced by the non-independent encoding viewing angle may be determined based on the viewing angle identifier information, the decoded data of the target independent encoding viewing angle is obtained, and the decoded data of the target independent encoding viewing angle is adjusted based on the pixel offset included in the reference information, to obtain the decoded data of the non-independent encoding viewing angle. The pixel offset may be a horizontal offset of a pixel, a vertical offset of the pixel, or a rotation angle offset of the pixel, or the pixel offset may include a combination of any two or three of the foregoing offsets.

For example, assuming that CTB 0 is a to-be-decoded picture block, encoded data of CTB 0 includes reference information of a viewing angle 2, and viewing angle identifier information included in the reference information of the viewing angle 2 is an identifier of a viewing angle 0, it may be determined that a target independent encoding viewing angle referenced by the viewing angle 2 is the viewing angle 0, and decoded data of CTB 0 of the viewing angle 0 obtained by decoding encoded information of CTB 0 of the viewing angle 0 is used. Assuming that the reference information of the viewing angle 2 further includes a horizontal offset of a pixel, and the horizontal offset of the pixel indicates to move CTB 0 of the viewing angle 2 leftward by d1 columns based on CTB 0 of the viewing angle 0, pixels in the decoded data of CTB 0 of the viewing angle 0 are moved leftward by the d1 columns based on the horizontal offset of the pixel in the reference information of the viewing angle 2, and pixels in d1 columns on the left are deleted after the movement, pixels in blank d1 columns on the right may be supplemented with pixels extracted from the decoded data of CTB 0 of the viewing angle 1.

For another example, assuming that CTB 3 is a to-be-decoded picture block, encoded data of CTB 3 includes reference information of a viewing angle 2, and viewing angle identifier information included in the reference information of the viewing angle 2 is an identifier of a viewing angle 0, it may be determined that a target independent encoding viewing angle referenced by the viewing angle 2 is the viewing angle 0, and decoded data of CTB 3 of the viewing angle 0 obtained by decoding encoded information of CTB 3 of the viewing angle 0 is used. Assuming that the reference information of the viewing angle 2 further includes a horizontal offset and a vertical offset of a pixel, the horizontal offset of the pixel indicates to move CTB 3 of the viewing angle 2 leftward by d1 columns based on CTB 3 of the viewing angle 0, and the vertical offset of the pixel indicates to move CTB 3 of the viewing angle 2 downward by d2 rows based on CTB 3 of the viewing angle 0, based on the horizontal offset of the pixel in the reference information of the viewing angle 2, pixels in the decoded data of CTB 3 of the viewing angle 0 are moved leftward by d1 columns, and pixels in d1 columns on the left are deleted after the movement, and pixels in blank d1 columns on the right may be supplemented with pixels extracted from the decoded data of CTB 3 of the viewing angle 1; and based on the vertical offset of the pixel in the reference information of the viewing angle 2, the pixels in the decoded data of CTB 3 of the viewing angle 0 are moved downward by d2 rows, pixels in lower d2 rows are deleted after the movement, and pixels in upper blank d2 rows may be supplemented with pixels extracted from the decoded data of CTB 0 of the viewing angle 0.

For another example, assuming that CTB 3 is a to-be-decoded picture block, encoded data of CTB 3 includes reference information of a viewing angle 2, and viewing angle identifier information included in the reference information of the viewing angle 2 is an identifier of a viewing angle 0, it may be determined that a target independent encoding viewing angle referenced by the viewing angle 2 is the viewing angle 0, and decoded data of CTB 3 of the viewing angle 0 obtained by decoding encoded information of CTB 3 of the viewing angle 0 is used. It is assumed that the reference information of the viewing angle 2 further includes a rotation angle offset of a pixel, and the rotation angle offset of the pixel indicates to rotate CTB 3 of the viewing angle 2 clockwise by 0 degrees based on CTB 3 of the viewing angle 0. In this case, in the decoded data of CTB 3 of the viewing angle 0, for a square pixel block with four vertices whose coordinates are respectively (30, 40), (30, 80), (60, 40), and (60, 80), after the square pixel block is rotated clockwise by 0 degrees, locations of four vertices of the square pixel block change. It is assumed that top vertex coordinates are (33, 35), bottom vertex coordinates are (57, 85), leftmost vertex coordinates are (28, 75), and rightmost vertex coordinates are (62, 45). In this case, it may be determined, based on the coordinates of the four vertices of the rotated square pixel block, that vertex coordinates of a square region from which a pixel needs to be obtained are (28, 35), (28, 85), (62, 35), and (62, 85). The pixel in the square region is obtained, and decoded data corresponding to a square pixel block whose vertex coordinates are (30, 40), (30, 80), (60, 40), and (60, 80) in CTB 3 of the viewing angle 2 is obtained through computing based on a pixel value of the obtained pixel. With reference to the foregoing method, the decoded data of CTB 3 of the viewing angle 0 may be adjusted based on the rotation angle offset of the pixel, to obtain decoded data of CTB 3 of the viewing angle 2.

Decoded data of the N picture blocks is obtained through the foregoing decoding process, and the decoded data of each picture block includes the decoded data of the plurality of viewing angles.

S703: Separately splice decoded data of each viewing angle into one video picture to obtain video pictures of the plurality of viewing angles.

It is still assumed that N is 6. For example, for the viewing angle 1, in the obtained decoded data of the plurality of viewing angles, CTB 0, CTB 1, CTB 2, CTB 3, CTB 4, and CTB 5 of the viewing angle 1 are obtained, and CTB 0, CTB 1, CTB 2, CTB 3, CTB 4, and CTB 5 of the viewing angle 1 are spliced into a video picture of the viewing angle 1. The video pictures of the plurality of viewing angles may be obtained according to the same method. After video pictures that are in one frame and that are of a plurality of viewing angles are decoded, video pictures that are in a next frame and that are of the plurality of viewing angles may further be decoded, where the video pictures in one frame are video pictures that are of the plurality of viewing angles and that are captured at a same moment.

A video playing device may control a display to display a video picture of a viewing angle based on the corresponding viewing angle selected by a user.

In comparison with independent encoding and compression of the video pictures of the plurality of viewing angles, in this embodiment of this application, the video playing device does not need to independently decode reference information of a non-independent encoding viewing angle included in encoded data, and may obtain decoded data of a picture block of the non-independent encoding viewing angle by referencing decoded data of a picture block of a target independent encoding viewing angle corresponding to the non-independent encoding viewing angle. Therefore, a computing amount in the decoding process can be reduced, computing resources consumed in the video decoding process can be reduced, and power consumption of the video playing device can be reduced.

In this embodiment of this application, the video pictures of the plurality of viewing angles are encoded by a same video encoding module, an encoded video compression stream is transmitted to a video decoding module, and the same video decoding module decodes the video compression stream to obtain the video pictures of the plurality of viewing angles.

Figure 8:
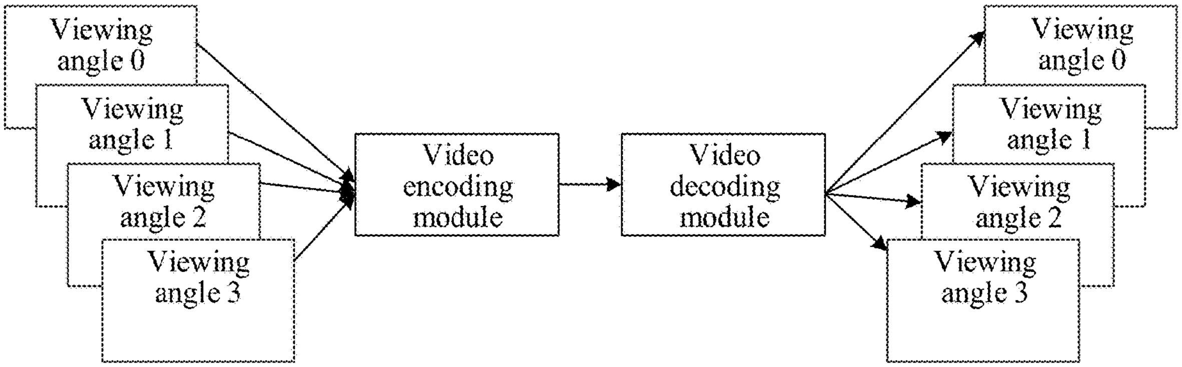
FIG. 8 is a schematic diagram of a video encoding and decoding process according to an embodiment of this application.

For example, as shown in FIG. 8, it is assumed that video pictures of four viewing angles need to be transmitted, and the video pictures of the four viewing angles are encoded by a same video encoding module. The video encoding module may be disposed in a video source device, and the video encoding module encodes the video pictures of the four viewing angles according to the video encoding method shown in FIG. 3 or FIG. 4A and FIG. 4B, to obtain a video compression stream. The video compression stream is transmitted to the video decoding module in a wired or wireless manner, and is decoded by using a same video encoding module. The video decoding module may be disposed in a video playing device, and the video decoding module decodes the video compression stream by using the video decoding method shown in FIG. 7, to obtain video pictures of four viewing angles. Video pictures of a plurality of viewing angles are almost decoded in parallel, and panoramic switching can be smoother.

In some embodiments, the video source device and the video playing device may be disposed in a same device, and are respectively a video generation module and a video playing module in the same device.

A same video encoding module is used to encode video pictures of a plurality of viewing angles, and a same video decoding module is used to decode a video compression stream. In this way, in comparison with independent encoding and independent decoding of video pictures of each viewing angle, fewer device resources are consumed, and device costs are saved.

The video encoding method provided in this embodiment of this application may be applied not only to the panoramic video field, but also to the VR or AR field. In comparison with conventional independent encoding of each video, in this embodiment of this application, redundant information of picture blocks at a same location of viewing angles can be reduced, a compression rate of multi-viewing angle videos can be improved, a code rate can be reduced, and a transmission bandwidth and storage space can be reduced. In additional, a same transmission channel can be used to transmit video pictures of more viewing angles, so that an audience can watch a video more smoothly when switching a viewing angle, or the same transmission channel can be used to transmit a video picture with a higher resolution, so that the audience can enjoy a clearer video.

In addition, in implementation of a codec in this embodiment of this application, because CTB-level fine-grained encoding is used, encoded information of a CTB at a same location of another viewing angle may be referenced for some viewing angles, so that multi-viewing angle CTBs can share a memory, CTB-level encoded information, and the like, performance of a video encoding device can be improved, and occupied (double data rate, DDR) channel bandwidths, power consumption, and the like can be reduced.

Based on a same inventive concept as the foregoing embodiment, an embodiment of this application further provides a video encoding apparatus. The video encoding apparatus may be understood as the video encoding module shown in FIG. 8, and may be used in the video source device 100 shown in FIG. 1. The video encoding apparatus may be configured to implement functions of the foregoing method embodiment, and therefore, beneficial effects of the foregoing method embodiment can be implemented.

The video encoding apparatus may include a picture division unit and a coding unit. The video encoding apparatus is configured to implement the functions in the method embodiment shown in FIG. 3. When the video encoding apparatus is configured to implement the functions of the method embodiment shown in FIG. 3, the picture division unit may be configured to perform S301, and the coding unit may be configured to perform S302 and S303. For example, the picture division unit is configured to obtain video pictures of a plurality of viewing angles at a same moment, and divide each video picture into N picture blocks, where N is an integer greater than 1. The coding unit is configured to generate encoded data of the N picture blocks based on the video pictures of the plurality of viewing angles, and obtain a video compression stream of the plurality of viewing angles based on the encoded data of the N picture blocks. The encoded data of the N picture blocks includes encoded data of at least one target picture block. The encoded data of the target picture block includes encoded information of a target picture block of an independent encoding viewing angle and reference information of a non-independent encoding viewing angle. The reference information of the non-independent encoding viewing angle indicates to decode a target picture block of the non-independent encoding viewing angle with reference to the encoded information of the target picture block of the independent encoding viewing angle, and both the independent encoding viewing angle and the non-independent encoding viewing angle are included in the plurality of viewing angles.

In a possible implementation, a picture block at a same location in each video picture has a same number; and the coding unit is specifically configured to: sequentially use each numbered picture block as a to-be-encoded picture block according to a sequence of numbers of the N picture blocks, and generate encoded data of the to-be-encoded picture block in the following manner: encoding a to-be-encoded picture block of a first viewing angle in the plurality of viewing angles to obtain encoded information of the first viewing angle, where the first viewing angle is an independent encoding viewing angle; and for each non-first viewing angle other than the first viewing angle in the plurality of viewing angles, if the non-first viewing angle is a non-independent encoding viewing angle, generating reference information of the non-first viewing angle; or if the non-first viewing angle is an independent encoding viewing angle, generating encoded information of a to-be-encoded picture block of the non-first viewing angle.

In a possible implementation, the coding unit may be specifically configured to: separately compare the to-be-encoded picture block of the non-first viewing angle with a to-be-encoded picture block of each determined independent encoding viewing angle, to determine a difference degree between each independent encoding viewing angle and the non-first viewing angle; if there is an independent encoding viewing angle with a difference degree meeting a specified difference degree threshold, determine that the non-first viewing angle is a non-independent encoding viewing angle; and generate the reference information of the non-first viewing angle based on information about a candidate independent encoding viewing angle, where the candidate independent encoding viewing angle indicates an independent encoding viewing angle whose difference degree meets the specified difference degree threshold.

In a possible implementation, the coding unit may be specifically configured to: if the candidate independent encoding viewing angle includes one independent encoding viewing angle, use the candidate independent encoding viewing angle as a target independent encoding viewing angle; and generate the reference information of the non-first viewing angle based on viewing angle identifier information of the target independent encoding viewing angle.

In a possible implementation, the coding unit may be specifically configured to: if the candidate independent encoding viewing angle includes a plurality of independent encoding viewing angles, use an independent encoding viewing angle with a smallest difference degree as a target independent encoding viewing angle; and generate the reference information of the non-first viewing angle based on viewing angle identifier information of the target independent encoding viewing angle.

In a possible implementation, the coding unit may be specifically configured to: determine a pixel offset of the to-be-encoded picture block of the non-first viewing angle relative to a to-be-encoded picture block of the target independent encoding viewing angle; and generate reference information that includes the viewing angle identifier information of the target independent encoding viewing angle and the pixel offset, where the reference information is the reference information of the non-first viewing angle.

In a possible implementation, the coding unit may be specifically configured to: separately compare the to-be-encoded picture block of the non-first viewing angle with the to-be-encoded picture block of each determined independent encoding viewing angle, to determine the difference degree between each independent encoding viewing angle and the non-first viewing angle; if there is no independent encoding viewing angle with a difference degree meeting the specified difference degree threshold, determine that the non-first viewing angle is an independent encoding viewing angle; and encode the to-be-encoded picture block of the non-first viewing angle, to obtain the encoded information of the to-be-encoded picture block of the non-first viewing angle.

Based on a same inventive concept as the foregoing embodiment, an embodiment of this application further provides a video decoding apparatus. The video decoding apparatus may be understood as the video decoding module shown in FIG. 8, and may be used in the video playing device shown in FIG. 1. The video decoding apparatus may be configured to implement functions of the foregoing method embodiment, and therefore, beneficial effects of the foregoing method embodiment can be implemented.

The video decoding apparatus may include a data receiving unit and a decoding unit. The video decoding apparatus is configured to implement the functions in the method embodiment shown in FIG. 7. When the video decoding apparatus is configured to implement the functions of the method embodiment shown in FIG. 7, the data receiving unit may be configured to perform S701, and the decoding unit may be configured to perform S702 and S703. For example, the data receiving unit is configured to: receive a video compression stream of a plurality of viewing angles, and obtain encoded data of N picture blocks included in the video compression stream, where N is an integer greater than 1, the encoded data of the N picture blocks is obtained by encoding video pictures of the plurality of viewing angles at a same moment, the encoded data of the N picture blocks includes encoded data of at least one target picture block, the encoded data of the target picture block includes encoded information of a target picture block of an independent encoding viewing angle and reference information of a non-independent encoding viewing angle, the reference information of the non-independent encoding viewing angle indicates to decode a target picture block of the non-independent encoding viewing angle with reference to the encoded information of the target picture block of the independent encoding viewing angle, and both the independent encoding viewing angle and the non-independent encoding viewing angle are included in the plurality of viewing angles. The decoding unit is configured to: decode the encoded data of the N picture blocks to obtain decoded data of the N picture blocks, where decoded data of each picture block includes decoded data of the plurality of viewing angles; and separately splice decoded data of each viewing angle into one video picture to obtain video pictures of the plurality of viewing angles.

In a possible implementation, the decoding unit may be specifically configured to: sequentially use each numbered picture block as a to-be-decoded picture block according to a sequence of numbers of the N picture blocks, and obtain decoded data of the to-be-decoded picture block in the following manner: decoding encoded information of an independent encoding viewing angle included in encoded data of the to-be-decoded picture block, to obtain decoded data of the independent encoding viewing angle; if the encoded data of the to-be-decoded picture block includes reference information of a non-independent encoding viewing angle, determining, based on viewing angle identifier information included in the reference information of the non-independent encoding viewing angle, a target independent encoding viewing angle referenced by the non-independent encoding viewing angle; and obtaining decoded data of the non-independent encoding viewing angle based on decoded data of the target independent encoding viewing angle, where the decoded data of the target independent encoding viewing angle is obtained by decoding encoded information of a to-be-decoded picture block of the target independent encoding viewing angle.

In a possible implementation, the reference information of the non-independent encoding viewing angle includes a pixel offset. The decoding unit may be specifically configured to adjust the decoded data of the target independent encoding viewing angle based on the pixel offset to obtain the decoded data of the non-independent encoding viewing angle.

Based on a same inventive concept as the foregoing embodiment, an embodiment of this application further provides a video encoding apparatus. The video encoding apparatus may be the video source device 100 shown in FIG. 1, or may be used in the video source device 100 shown in FIG. 1. The video encoding apparatus may be configured to implement the functions of the foregoing method embodiment, and therefore, beneficial effects of the foregoing method embodiment can be implemented.

Figure 9:
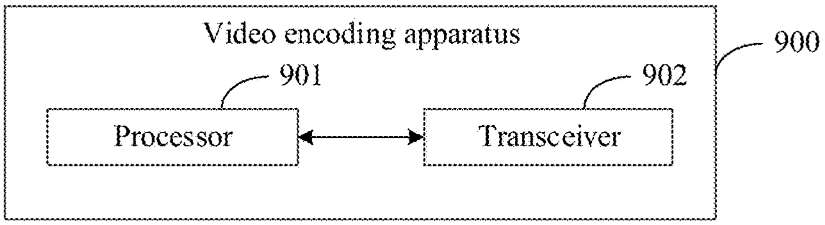
FIG. 9 is a schematic diagram of a video encoding apparatus according to an embodiment of this application.

FIG. 9 is a schematic diagram of a structure of a video encoding apparatus. Refer to FIG. 9. The video encoding apparatus 900 may include a processor 901 and a transceiver 902 connected to the processor 901.

Optionally, the processor 901 and the transceiver 902 may be connected to each other through a bus. The processor 901 may be a general purpose processor, for example, a microprocessor, or another conventional processor. The bus may be a peripheral component interconnect (PCI) bus or an extended industry standard architecture (EISA) bus, or the like. Buses may be classified into an address bus, a data bus, a control bus, and the like.

In some embodiments, the video encoding apparatus may further include a memory or an external memory. The memory is configured to store program instructions, data, and the like. Specifically, the program instructions may include program code. The program code includes computer operation instructions. The memory may include a random access memory (RAM), or may further include a non-volatile memory, for example, at least one magnetic disk memory.

The processor 901 is configured to read the program instructions from the memory, and perform the following steps: obtaining video pictures of a plurality of viewing angles at a same moment, and dividing each video picture into N picture blocks; generating encoded data of the N picture blocks based on the video pictures of the plurality of viewing angles; and obtaining a video compression stream of the plurality of viewing angles based on the encoded data of the N picture blocks. N is an integer greater than 1. The encoded data of the N picture blocks includes encoded data of at least one target picture block. The encoded data of the target picture block includes encoded information of a target picture block of an independent encoding viewing angle and reference information of a non-independent encoding viewing angle. The reference information of the non-independent encoding viewing angle indicates to decode a target picture block of the non-independent encoding viewing angle with reference to the encoded information of the target picture block of the independent encoding viewing angle, and both the independent encoding viewing angle and the non-independent encoding viewing angle are included in the plurality of viewing angles.

The transceiver 902 is configured to send, under control of the processor 901, the video compression stream of the plurality of viewing angles.

In a possible implementation, a picture block at a same location in each video picture has a same number; and the processor 901 is specifically configured to: sequentially use each numbered picture block as a to-be-encoded picture block according to a sequence of numbers of the N picture blocks, and generate encoded data of the to-be-encoded picture block in the following manner: encoding a to-be-encoded picture block of a first viewing angle in the plurality of viewing angles to obtain encoded information of the first viewing angle, where the first viewing angle is an independent encoding viewing angle; and for each non-first viewing angle other than the first viewing angle in the plurality of viewing angles, if the non-first viewing angle is a non-independent encoding viewing angle, generating reference information of the non-first viewing angle; or if the non-first viewing angle is an independent encoding viewing angle, generating encoded information of a to-be-encoded picture block of the non-first viewing angle.

In a possible implementation, the processor 901 may be specifically configured to: separately compare the to-be-encoded picture block of the non-first viewing angle with a to-be-encoded picture block of each determined independent encoding viewing angle, to determine a difference degree between each independent encoding viewing angle and the non-first viewing angle; if there is an independent encoding viewing angle with a difference degree meeting a specified difference degree threshold, determine that the non-first viewing angle is a non-independent encoding viewing angle; and generate the reference information of the non-first viewing angle based on information about a candidate independent encoding viewing angle, where the candidate independent encoding viewing angle indicates an independent encoding viewing angle whose difference degree meets the specified difference degree threshold.

In a possible implementation, the processor 901 may be specifically configured to: if the candidate independent encoding viewing angle includes one independent encoding viewing angle, use the candidate independent encoding viewing angle as a target independent encoding viewing angle; and generate the reference information of the non-first viewing angle based on viewing angle identifier information of the target independent encoding viewing angle.

In a possible implementation, the processor 901 may be specifically configured to: if the candidate independent encoding viewing angle includes a plurality of independent encoding viewing angles, use an independent encoding viewing angle with a smallest difference degree as a target independent encoding viewing angle; and generate the reference information of the non-first viewing angle based on viewing angle identifier information of the target independent encoding viewing angle.

In a possible implementation, the processor 901 may be specifically configured to: determine a pixel offset of the to-be-encoded picture block of the non-first viewing angle relative to a to-be-encoded picture block of the target independent encoding viewing angle; and generate reference information that includes the viewing angle identifier information of the target independent encoding viewing angle and the pixel offset, where the reference information is the reference information of the non-first viewing angle.

In a possible implementation, the processor 901 may be specifically configured to: separately compare the to-be-encoded picture block of the non-first viewing angle with the to-be-encoded picture block of each determined independent encoding viewing angle, to determine the difference degree between each independent encoding viewing angle and the non-first viewing angle; if there is no independent encoding viewing angle with a difference degree meeting the specified difference degree threshold, determine that the non-first viewing angle is an independent encoding viewing angle; and encode the to-be-encoded picture block of the non-first viewing angle, to obtain the encoded information of the to-be-encoded picture block of the non-first viewing angle.

Based on a same inventive concept as the foregoing embodiment, an embodiment of this application further provides a video decoding apparatus. The video decoding apparatus may be the video playing device 200 shown in FIG. 1, or may be used in the video playing device 200 shown in FIG. 1. The video decoding apparatus may be configured to implement the functions of the foregoing method embodiment, and therefore, beneficial effects of the foregoing method embodiment can be implemented.

Figure 10:
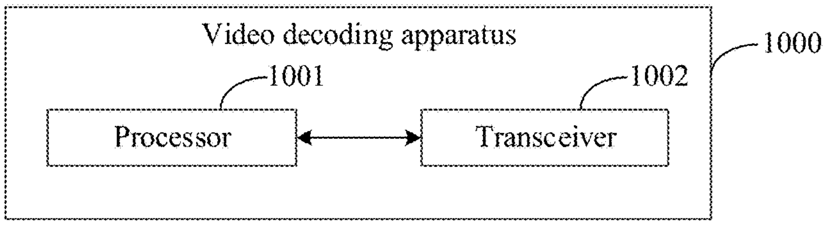
FIG. 10 is a schematic diagram of a video decoding apparatus according to an embodiment of this application.

FIG. 10 is a schematic diagram of a structure of a video decoding apparatus. Refer to FIG. 10. The video encoding apparatus 1000 may include a processor 1001 and a transceiver 1002 connected to the processor 1001.

Optionally, the processor 1001 and the transceiver 1002 may be connected to each other through a bus. The processor 1001 may be a general purpose processor, for example, a microprocessor, or another conventional processor. The bus may be a peripheral component interconnect (PCI) bus or an extended industry standard architecture (EISA) bus, or the like. Buses may be classified into an address bus, a data bus, a control bus, and the like.

In some embodiments, the video decoding apparatus may further include a memory or an external memory. The memory is configured to store program instructions, data, and the like. Specifically, the program instructions may include program code. The program code includes computer operation instructions. The memory may include a random access memory (RAM), or may further include a non-volatile memory, for example, at least one magnetic disk memory.

The transceiver 1002 is configured to receive, under control of the processor 1001, the video compression stream of the plurality of viewing angles.

The processor 1001 is configured to read the program instructions from the memory, and perform the following steps: obtaining encoded data of N picture blocks included in the video compression stream, where N is an integer greater than 1, the encoded data of the N picture blocks is obtained by encoding video pictures of the plurality of viewing angles at a same moment, the encoded data of the N picture blocks includes encoded data of at least one target picture block, the encoded data of the target picture block includes encoded information of a target picture block of an independent encoding viewing angle and reference information of a non-independent encoding viewing angle, the reference information of the non-independent encoding viewing angle indicates to decode a target picture block of the non-independent encoding viewing angle with reference to the encoded information of the target picture block of the independent encoding viewing angle, and both the independent encoding viewing angle and the non-independent encoding viewing angle are included in the plurality of viewing angles; decoding the encoded data of the N picture blocks to obtain decoded data of the N picture blocks, where decoded data of each picture block includes decoded data of the plurality of viewing angles; and separately splicing decoded data of each viewing angle into one video picture to obtain video pictures of the plurality of viewing angles.

In some embodiments, the video decoding apparatus may further include a display, and a video picture obtained through decoding may be displayed on the display.

In a possible implementation, the processor 1001 may be specifically configured to: sequentially use each numbered picture block as a to-be-decoded picture block according to a sequence of numbers of the N picture blocks, and obtain decoded data of the to-be-decoded picture block in the following manner: decoding encoded information of an independent encoding viewing angle included in encoded data of the to-be-decoded picture block, to obtain decoded data of the independent encoding viewing angle; if the encoded data of the to-be-decoded picture block includes reference information of a non-independent encoding viewing angle, determining, based on viewing angle identifier information included in the reference information of the non-independent encoding viewing angle, a target independent encoding viewing angle referenced by the non-independent encoding viewing angle; and obtaining decoded data of the non-independent encoding viewing angle based on decoded data of the target independent encoding viewing angle, where the decoded data of the target independent encoding viewing angle is obtained by decoding encoded information of a to-be-decoded picture block of the target independent encoding viewing angle.

In a possible implementation, the reference information of the non-independent encoding viewing angle includes a pixel offset. The processor 1001 may be specifically configured to adjust the decoded data of the target independent encoding viewing angle based on the pixel offset to obtain the decoded data of the non-independent encoding viewing angle.

Based on a same inventive concept as the foregoing embodiment, an embodiment of this application further provides a video transmission system. The video transmission system may include the video encoding apparatus shown in FIG. 9 and the video decoding apparatus shown in FIG. 10. In some embodiments, it may also be understood that the video transmission system may include the video source device 100 and the video playing device 200 shown in FIG. 1. The video source device 100 encodes video pictures of a plurality of viewing angles according to the video encoding method shown in FIG. 3, and the video playing device 200 decodes encoded data of a plurality of viewing angles according to the video decoding method shown in FIG. 7.

Based on the foregoing embodiments, an embodiment of this application further provides a computer program product, including a computer program or instructions. When the computer program or the instructions are run on a computer, the computer is enabled to perform any video encoding method or video decoding method provided in the foregoing embodiments.

Based on the foregoing embodiments, an embodiment of this application further provides a computer-readable storage medium. The computer-readable storage medium stores a computer program. When the computer program is executed by a computer, the computer is enabled to perform any video encoding method or video decoding method provided in the foregoing embodiments.

The storage medium may be any available medium that can be accessed by the computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer.

Based on the foregoing embodiments, an embodiment of this application further provides a chip. The chip is configured to read a computer program stored in a memory, to implement any video encoding method or video decoding method provided in the foregoing embodiments.

Based on the foregoing embodiments, an embodiment of this application provides a chip system. The chip system includes a processor, configured to support a computer apparatus in implementing a function of any node in the foregoing embodiments. In a possible design, the chip system further includes a memory. The memory is configured to store a program and data that are necessary for the computer apparatus. The chip system may include a chip, or may include a chip and another discrete component.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the protection scope of this application. This application is intended to cover these modifications and variations of this application provided that they fall within the scope of protection defined by the following claims and their equivalent technologies.

What is claimed is:

1. A video encoding method applied to an encoding apparatus, the method comprising:

obtaining video pictures of a plurality of viewing angles at a same moment, and dividing each video picture into N picture blocks in the same manner such that picture blocks at a same location in each video picture have a same number, wherein N is an integer greater than 1;

generating encoded data of the N picture blocks based on the video pictures of the plurality of viewing angles, wherein the encoded data of the N picture blocks comprises encoded data of at least one target picture block, wherein the target picture block is a picture block at a same location in each video picture of the plurality of viewing angles, wherein the encoded data of the target picture block comprises encoded information of the target picture block of an independent encoding viewing angle and reference information of the target picture block of a non-independent encoding viewing angle, wherein the reference information of the non-independent encoding viewing angle indicates to decode the target picture block of the non-independent encoding viewing angle with reference to the encoded information of the target picture block of the independent encoding viewing angle, wherein both the independent encoding viewing angle and the non-independent encoding viewing angle are comprised in the plurality of viewing angles, and wherein the generating encoded data of the N picture blocks based on the video pictures of the plurality of viewing angles comprises sequentially using each numbered picture block at the same location in each video picture as a target picture block to be encoded according to a sequence of numbers of the N picture blocks; and obtaining a video compression stream of the plurality of viewing angles based on the encoded data of the N picture blocks.

2. The method according to claim 1, wherein a number of a picture block at a same location in each video picture is the same, and generating the encoded data of the N picture blocks based on the video pictures of the plurality of viewing angles comprises:

sequentially using each numbered picture block at the same location in each video picture as a target picture block to be encoded according to a sequence of numbers of the N picture blocks, and generating encoded data of the target picture block in the following manner:

encoding the target picture block of a first viewing angle in the plurality of viewing angles to obtain encoded information of the first viewing angle, wherein the first viewing angle is an independent encoding viewing angle; and for each non-first viewing angle other than the first viewing angle in the plurality of viewing angles, based on the non-first viewing angle being a non-independent encoding viewing angle, generating reference information of the non-first viewing angle; or based on the non-first viewing angle being an independent encoding viewing angle, generating encoded information of the target block picture block of the non-first viewing angle.

3. The method according to claim 2, wherein generating the reference information of the non-first viewing angle based on the non-first viewing angle being a non-independent encoding viewing angle comprises:

separately comparing the target picture block of the non-first viewing angle with a target picture block of each determined independent encoding viewing angle, to determine a difference degree between each independent encoding viewing angle and the non-first viewing angle;

based on there being an independent encoding viewing angle with a difference degree meeting a specified difference degree threshold, determining the non-first viewing angle is a non-independent encoding viewing angle; and generating the reference information of the target picture block of the non-first viewing angle based on information about a candidate independent encoding viewing angle, wherein the candidate independent encoding viewing angle indicates an independent encoding viewing angle whose difference degree meets the specified difference degree threshold, and wherein the independent encoding viewing angle with the smallest difference degree is used for generating the reference information based on the candidate independent encoding viewing angle including a plurality of independent encoding viewing angles.

4. The method according to claim 3, wherein generating the reference information of the non-first viewing angle based on the information about the candidate independent encoding viewing angle comprises:

based on the candidate independent encoding viewing angle comprising one independent encoding viewing angle, using the candidate independent encoding viewing angle as a target independent encoding viewing angle; and generating the reference information of the non-first viewing angle based on viewing angle identifier information of the target independent encoding viewing angle.

5. The method according to claim 3, wherein generating the reference information of the non-first viewing angle based on the information about the candidate independent encoding viewing angle comprises:

based on the candidate independent encoding viewing angle comprising a plurality of independent encoding viewing angles, using an independent encoding viewing angle with a smallest difference degree as a target independent encoding viewing angle; and generating the reference information of the non-first viewing angle based on viewing angle identifier information of the target independent encoding viewing angle.

6. The method according to claim 4, wherein generating the reference information of the non-first viewing angle based on the viewing angle identifier information of the target independent encoding viewing angle comprises:

determining a pixel offset that is a spatial offset comprising at least one of a horizontal offset, a vertical offset, or a rotation angle offset of a pixel of the target picture block of the non-first viewing angle relative to a to-be-encoded picture block of the target independent encoding viewing angle; and generating the reference information of the non-first viewing angle, wherein the reference information comprises the viewing angle identifier information of the target independent encoding viewing angle and the pixel offset.

7. The method according to claim 2, wherein generating the encoded information of the target picture block of the non-first viewing angle based on the non-first viewing angle being the independent encoding viewing angle comprises:

separately comparing the target picture block of the non-first viewing angle with the target picture block of each determined independent encoding viewing angle, to determine a difference degree between each independent encoding viewing angle and the non-first viewing angle;

based on there being no independent encoding viewing angle with a difference degree meeting a specified difference degree threshold, determining that the non-first viewing angle is an independent encoding viewing angle; and encoding the target picture block of the non-first viewing angle, to obtain the encoded information of the target picture block of the non-first viewing angle.

8. A video decoding method applied to a decoding apparatus, the method comprising:

receiving a video compression stream of a plurality of viewing angles, and obtaining encoded data of N picture blocks comprised in the video compression stream, wherein N is an integer greater than 1, wherein the encoded data of the N picture blocks is obtained by encoding video pictures of the plurality of viewing angles at a same moment, wherein each video picture is divided into N picture blocks in the same manner such that picture blocks at a same location in each video picture have a same number, wherein the encoded data of the N picture blocks comprises encoded data of at least one target picture block, wherein the target picture block is a picture block at a same location in each video picture of the plurality of viewing angles, wherein the encoded data of the target picture block comprises encoded information of the target picture block of an independent encoding viewing angle and reference information of the target picture block of a non-independent encoding viewing angle, wherein the reference information of the non-independent encoding viewing angle indicates to decode the target picture block of the non-independent encoding viewing angle with reference to the encoded information of the target picture block of the independent encoding viewing angle, and wherein both the independent encoding viewing angle and the non-independent encoding viewing angle are comprised in the plurality of viewing angles;

decoding the encoded data of the N picture blocks to obtain decoded data of the N picture blocks, wherein decoded data of each picture block comprises decoded data of the plurality of viewing angles, and wherein the decoding the encoded data of the N picture blocks to obtain decoded data of the N picture blocks comprises sequentially using each numbered picture block at the same location in each video picture as a target picture block to be decoded according to a sequence of numbers of the N picture blocks; and separately splicing decoded data of each viewing angle into one video picture to obtain video pictures of the plurality of viewing angles.

9. The method according to claim 8, wherein decoding the encoded data of the N picture blocks to obtain the decoded data of the N picture blocks comprises:

sequentially using each numbered picture block at the same location in each video picture as a target picture block according to a sequence of numbers of the N picture blocks, and obtaining decoded data of the target picture block in the following manner:

decoding encoded information of an independent encoding viewing angle comprised in encoded data of the target picture block to obtain decoded data of the independent encoding viewing angle;

based on the encoded data of the target picture block comprising reference information of a non-independent encoding viewing angle, determining, from viewing angle identifier information in the reference information of the non-independent encoding viewing angle, a target independent encoding viewing angle referenced by the non-independent encoding viewing angle; and obtaining decoded data of the non-independent encoding viewing angle based on decoded data of the target independent encoding viewing angle, wherein the decoded data of the target independent encoding viewing angle is obtained by decoding encoded information of a target picture block of the target independent encoding viewing angle.

10. The method according to claim 9, wherein the reference information of the non-independent encoding viewing angle comprises a pixel offset that is a spatial offset comprising at least one of a horizontal offset, a vertical offset, or a rotation angle offset of a pixel, and wherein obtaining the decoded data of the non-independent encoding viewing angle based on the decoded data of the target independent encoding viewing angle comprises:

adjusting the decoded data of the target independent encoding viewing angle based on the pixel offset to obtain the decoded data of the non-independent encoding viewing angle.

11. A video encoding apparatus comprising a processor and a transceiver, wherein the processor is configured to cooperate with the transceiver to:

obtain video pictures of a plurality of viewing angles at a same moment, and divide each video picture into N picture blocks in the same manner such that picture blocks at a same location in each video picture have a same number, wherein N is an integer greater than 1;

generate encoded data of the N picture blocks based on the video pictures of the plurality of viewing angles, wherein the encoded data of the N picture blocks comprises encoded data of at least one target picture block, wherein the target picture block is a picture block at a same location in each video picture of the plurality of viewing angles, wherein the encoded data of the target picture block comprises encoded information of the target picture block of an independent encoding viewing angle and reference information of the target picture block of a non-independent encoding viewing angle, wherein the reference information of the non-independent encoding viewing angle indicates to decode the target picture block of the non-independent encoding viewing angle with reference to the encoded information of the target picture block of the independent encoding viewing angle, and wherein both the independent encoding viewing angle and the non-independent encoding viewing angle are comprised in the plurality of viewing angles, and wherein the generating encoded data of the N picture blocks based on the video pictures of the plurality of viewing angles comprises sequentially using each numbered picture block at the same location in each video picture as a target picture block to be encoded according to a sequence of numbers of the N picture blocks; and obtain a video compression stream of the plurality of viewing angles based on the encoded data of the N picture blocks; and the transceiver is configured to cooperate with the processor to send the video compression stream of the plurality of viewing angles.

12. The apparatus according to claim 11, wherein a picture block at a same location in each video picture has a same number; and the processor is further configured to:

sequentially use each numbered picture block at the same location in each video picture as a target picture block to be encoded according to a sequence of numbers of the N picture blocks, and generate encoded data of the target picture block in the following manner:

encoding a target picture block of a first viewing angle in the plurality of viewing angles to obtain encoded information of the first viewing angle, wherein the first viewing angle is an independent encoding viewing angle; and for each non-first viewing angle other than the first viewing angle in the plurality of viewing angles, based on the non-first viewing angle being a non-independent encoding viewing angle, generating reference information of the non-first viewing angle; or based on the non-first viewing angle being an independent encoding viewing angle, generating encoded information of the non-first viewing angle.

13. The apparatus according to claim 12, wherein the processor is further configured to:

separately compare the target picture block of the non-first viewing angle with a target picture block of each determined independent encoding viewing angle, to determine a difference degree between each independent encoding viewing angle and the non-first viewing angle;

based on there being an independent encoding viewing angle with a difference degree meeting a specified difference degree threshold, determine the non-first viewing angle is a non-independent encoding viewing angle; and generate the reference information of the target picture block of the non-first viewing angle based on information about a candidate independent encoding viewing angle, wherein the candidate independent encoding viewing angle indicates an independent encoding viewing angle whose difference degree meets the specified difference degree threshold, and wherein the independent encoding viewing angle with the smallest difference degree is used for generating the reference information based on the candidate independent encoding viewing angle including a plurality of independent encoding viewing angles.

14. The apparatus according to claim 13, wherein the processor is further configured to:

based on the candidate independent encoding viewing angle comprising one independent encoding viewing angle, use the candidate independent encoding viewing angle as a target independent encoding viewing angle; and generate the reference information of the non-first viewing angle based on viewing angle identifier information of the target independent encoding viewing angle.

15. The apparatus according to claim 13, wherein the processor is further configured to:

based on the candidate independent encoding viewing angle comprising a plurality of independent encoding viewing angles, use an independent encoding viewing angle with a smallest difference degree as a target independent encoding viewing angle; and generate the reference information of the non-first viewing angle based on viewing angle identifier information of the target independent encoding viewing angle.

16. The apparatus according to claim 14, wherein the processor is further configured to:

determine a pixel offset is a spatial offset comprising at least one of a horizontal offset, a vertical offset, or a rotation angle offset of a pixel of the target picture block of the non-first viewing angle relative to a corresponding pixel of the target picture block of the target independent encoding viewing angle; and generate the reference information of the non-first viewing angle, wherein the reference information comprises the viewing angle identifier information of the target independent encoding viewing angle and the pixel offset.

17. The apparatus according to claim 12, wherein the processor is further configured to:

separately compare the non-first viewing angle with the target picture block of each determined independent encoding viewing angle, to determine a difference degree between each independent encoding viewing angle and the non-first viewing angle;

based on there being no independent encoding viewing angle with a difference degree meeting a specified difference degree threshold, determine that the non-first viewing angle is an independent encoding viewing angle; and encode the target picture block of the non-first viewing angle, to obtain the encoded information of the target block of the non-first viewing angle.

18. The method according to claim 5, wherein generating the reference information of the non-first viewing angle based on viewing angle identifier information of the target independent encoding viewing angle comprises:

determining a pixel offset of the target picture block of the non-first viewing angle relative to a target picture block of the target independent encoding viewing angle; and generating the reference information of the non-first viewing angle, wherein the reference information comprises the viewing angle identifier information of the target independent encoding viewing angle and the pixel offset.

19. The method according to claim 3, wherein generating the encoded information of the target picture block of the non-first viewing angle based on the non-first viewing angle being the independent encoding viewing angle comprises:

separately comparing the target picture block of the non-first viewing angle with the target picture block of each determined independent encoding viewing angle to determine the difference degree between each independent encoding viewing angle and the non-first viewing angle;

based on there being no independent encoding viewing angle with a difference degree meeting the specified difference degree threshold, determining that the non-first viewing angle is an independent encoding viewing angle; and encoding the target picture block of the non-first viewing angle to obtain the encoded information of the target picture block of the non-first viewing angle.

20. The method according to claim 4, wherein generating the encoded information of the target picture block of the non-first viewing angle based on the non-first viewing angle being the independent encoding viewing angle comprises:

separately comparing the target picture block of the non-first viewing angle with the target picture block of each determined independent encoding viewing angle to determine the difference degree between each independent encoding viewing angle and the non-first viewing angle;

based on there being no independent encoding viewing angle with a difference degree meeting the specified difference degree threshold, determining that the non-first viewing angle is an independent encoding viewing angle; and encoding the target picture block of the non-first viewing angle to obtain the encoded information of the target picture block of the non-first viewing angle.

* * * * *